(12) United States Patent
Abe et al.

(10) Patent No.: US 9,655,098 B2
(45) Date of Patent: *May 16, 2017

(54) MICRO BASE STATION, USER TERMINAL AND RADIO COMMUNICATION METHOD

(71) Applicant: NTT DOCOMO, INC., Tokyo (JP)

(72) Inventors: Tetsushi Abe, Tokyo (JP); Satoshi Nagata, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,001

(22) Filed: Mar. 16, 2016

(65) Prior Publication Data

US 2016/0270039 A1 Sep. 15, 2016

Related U.S. Application Data

(62) Division of application No. 13/985,337, filed as application No. PCT/JP2012/053293 on Feb. 13, 2012, now Pat. No. 9,326,154.

(30) Foreign Application Priority Data

Feb. 14, 2011 (JP) .................................. 2011-029081

(51) Int. Cl.
*H04B 7/216* (2006.01)
*H04B 7/208* (2006.01)
(Continued)

(52) U.S. Cl.
CPC ....... *H04W 72/042* (2013.01); *H04J 11/0056* (2013.01); *H04L 5/00* (2013.01);
(Continued)

(58) Field of Classification Search
CPC ............ H04W 24/10; H04W 72/0426; H04W 56/001; H04W 24/00; H04W 72/1273;
(Continued)

(56) References Cited

U.S. PATENT DOCUMENTS

2010/0151858 A1* 6/2010 Brisebois .............. H04W 24/10
455/434
2010/0173637 A1* 7/2010 Damnjanovic ....... H04L 5/0007
455/447

(Continued)

FOREIGN PATENT DOCUMENTS

JP 2012-169859 A 9/2012

OTHER PUBLICATIONS

International Search Report issued in PCT/JP2012/053293 mailed May 1, 2012 (2 pages).

(Continued)

Primary Examiner — Thai Hoang
(74) Attorney, Agent, or Firm — Osha Liang LLP

(57) ABSTRACT

The present invention is designed to reduce interference from a macro base station to a small transmission power node. The present invention is characterized in providing a micro base station which forms, in a macro cell where a macro base station transmits a signal to a macro terminal, a micro cell where the micro base station transmits a signal to a micro terminal under control with low power, and this micro base station generates a PDCCH which includes downlink or uplink resource allocation information, and, in a non-transmission period in which the macro base station stops transmitting signals while leaving minimal quality measurement signals, shifts the transmission starting symbol of the PDCCH to a position where the PDCCH does not overlap the quality measurement signals.

2 Claims, 12 Drawing Sheets

(51) Int. Cl.
    *H04W 4/00* (2009.01)
    *H04W 72/04* (2009.01)
    *H04L 5/00* (2006.01)
    *H04W 28/04* (2009.01)
    *H04W 16/14* (2009.01)
    *H04W 72/12* (2009.01)
    *H04J 11/00* (2006.01)
    *H04W 48/12* (2009.01)
    *H04W 88/08* (2009.01)
    *H04W 24/10* (2009.01)
    *H04W 16/32* (2009.01)
    *H04L 1/18* (2006.01)
    *H04W 48/10* (2009.01)

(52) U.S. Cl.
    CPC .......... *H04L 5/0007* (2013.01); *H04L 5/0035* (2013.01); *H04L 5/0053* (2013.01); *H04L 5/0073* (2013.01); *H04L 5/0091* (2013.01); *H04W 16/14* (2013.01); *H04W 28/048* (2013.01); *H04W 48/12* (2013.01); *H04W 72/1226* (2013.01); *H04L 1/1812* (2013.01); *H04W 16/32* (2013.01); *H04W 24/10* (2013.01); *H04W 48/10* (2013.01); *H04W 88/08* (2013.01)

(58) Field of Classification Search
    CPC .... H04W 16/32; H04L 5/0007; H04L 5/0057; H04B 7/024
    USPC ................. 370/252, 342, 336, 329; 455/434, 455/443–444, 447, 450
    See application file for complete search history.

(56) References Cited

U.S. PATENT DOCUMENTS

| | | | |
|---|---|---|---|
| 2013/0021929 A1* | 1/2013 | Kim ....................... | H04B 7/024 370/252 |
| 2013/0136074 A1* | 5/2013 | Okino ................... | H04W 24/00 370/329 |
| 2013/0172001 A1* | 7/2013 | Gerlach ................ | H04W 16/32 455/450 |
| 2013/0259022 A1* | 10/2013 | Jitsukawa ......... | H04W 72/1273 370/342 |
| 2013/0322392 A1 | 12/2013 | Abe et al. | |
| 2014/0119349 A1* | 5/2014 | Takano ............... | H04W 56/001 370/336 |
| 2014/0192759 A1* | 7/2014 | Son ................... | H04W 72/0426 370/329 |
| 2015/0092583 A1* | 4/2015 | Balraj .................. | H04L 5/0057 370/252 |

OTHER PUBLICATIONS

3GPP TS 36.300 V10.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2"; Dec. 2012 (200 pages).

Japanese Office Action issued in Japanese Patent Application No. 2011-029081, mailing date Oct. 8, 2013, with English translation thereof (8 pages).

3GPP TSG RAN WG1 Meeting #60, R1-101106; "PDCCH Interference Management for Heterogeneous Network;" Research in Motion UK Limited; San Francisco, USA; Feb. 22-26, 2010 (5 pages).

3GPP TSG RAN WG1 Meeting #61, R1-102673; "Assessment of Control Interference Coordination in Co-Channel Het-Net;" CATT; Montreal, Canada; May 10-14, 2010 (5 pages).

3GPP TSG-RAN WG1 Meeting #62, R1-104884; "Interference Coordination for Control Channels in Macro-Femto Development;" Fujitsu; Madrid, Spain; Aug. 23-27, 2010 (8 pages).

Decision to Grant a Patent in counterpart Japanese Patent Application No. JP2011-029081 mailed Jan. 7, 2014 (4 pages).

Office Action issued in corresponding Japanese Application No. 2013-253802, mailed Oct. 21, 2014 (8 pages).

Decision to grant a patent issued in corresponding Japanese Application No. 2013-253802, mailed Jan. 20, 2015 (5 pages).

* cited by examiner

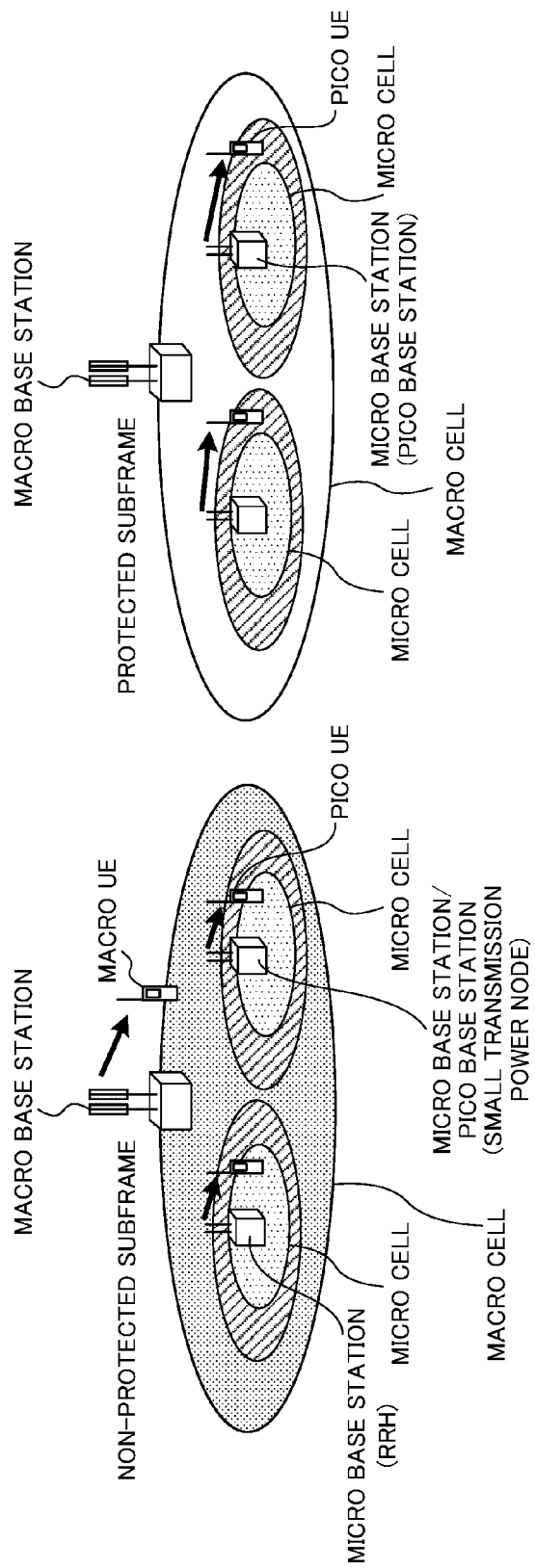

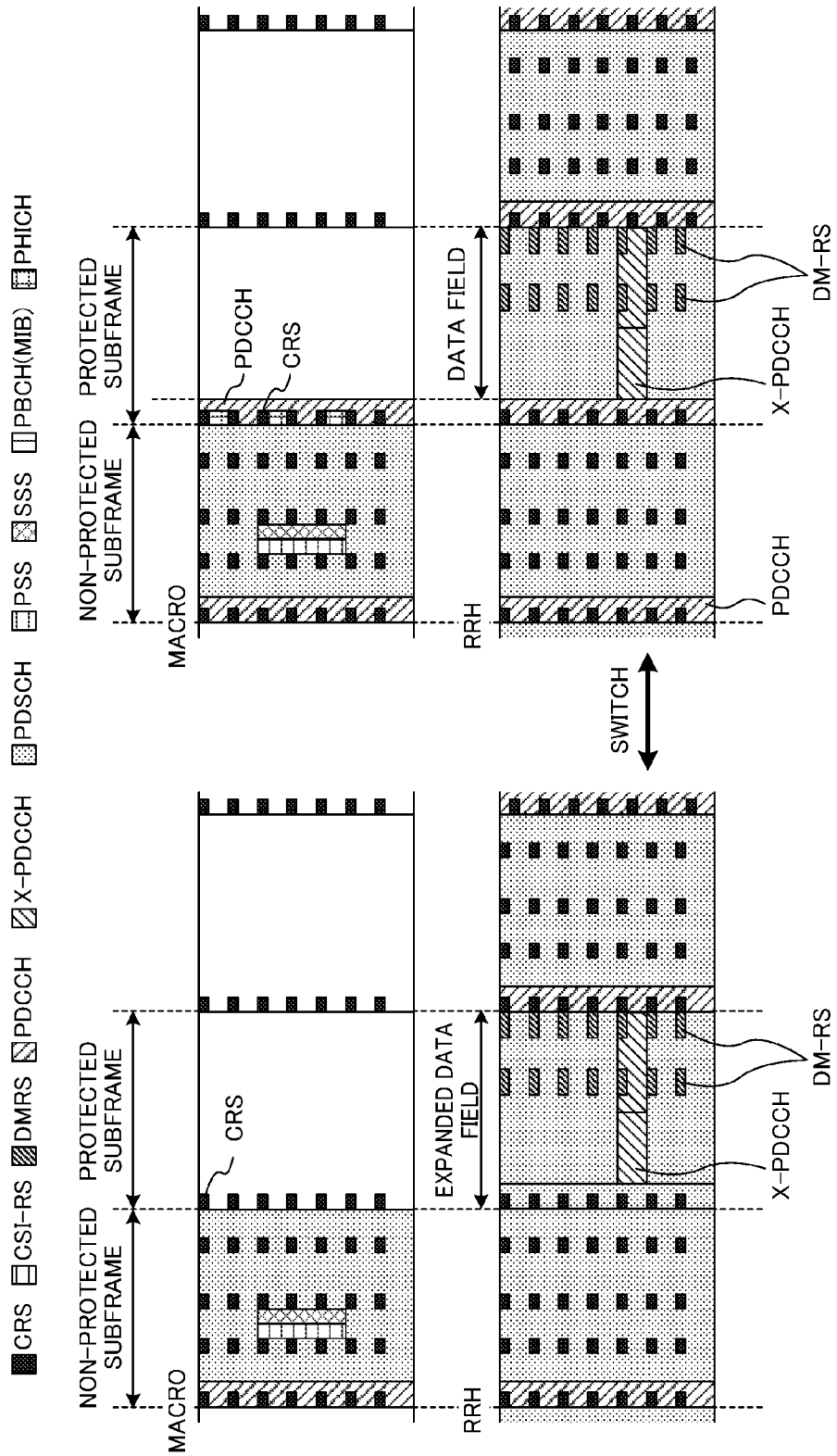

MICRO BASE STATION, USER TERMINAL AND RADIO COMMUNICATION METHOD

CROSS-REFERENCE TO RELATED APPLICATIONS

The present application is a divisional application of and, thereby, claims benefit under 35 U.S.C. §120 to U.S. patent application Ser. No. 13/985,337 filed on Aug. 14, 2013, titled, "MICRO BASE STATION, USER TERMINAL AND RADIO COMMUNICATION METHOD," which is a national stage application of PCT Application No. PCT/JP2012/053293, filed on Feb. 13, 2012, which claims priority to Japanese Patent Application No. 2011-029081, filed on Feb. 14, 2011. The contents of the priority applications are incorporated by reference in their entirety.

TECHNICAL FIELD

Embodiments of the present invention relate to a micro base station, a user terminal and a radio communication method in a radio communication system in which a micro cell is overlaid in a macro cell.

BACKGROUND ART

Presently, in the 3GPP (Third Generation Partnership Project), the standardization of LTE-advanced (hereinafter the LTE Release 10 specifications and the specifications of later versions will be collectively referred to as "LTE-A"), which is an evolved radio interface of the LTE (Long Term Evolution) Release 8 specifications (hereinafter referred to as "LTE" or "Rel. 8") is in progress. LTE-A is attempting to realize higher system performance than LTE while maintaining backward compatibility with LTE.

Also, in LTE-A, a micro cell (for example, a pico cell, a femto cell, and so on), which has a local coverage area of a radius of approximately several tens of meters, is formed in a macro cell, which has a wide coverage area of a radius of approximately several kilometers. A network configuration such as this in which nodes of different powers are overlaid is referred to as a "HetNet" (Heterogeneous Network) (see, for example, non-patent literature 1). A normal radio base station to form a macro cell will be hereinafter referred to as a "macro base station," and a pico base station or a femto base station of lower transmission power will be hereinafter referred to as a "small transmission power node." Small transmission power nodes include a base station antenna apparatus (RRH: Remote Radio Head). A base station antenna apparatus is a small transmission power node that is set in a distant location from a macro base station using optical fiber and so on, and forms a micro cell under control of a macro base station.

CITATION LIST

Non-Patent Literature

[Non-Patent Literature 1] 3GPP, TS36.300

SUMMARY OF INVENTION

However, in a HetNet, in which a micro cell that is formed by a small transmission power node having low transmission power is overlaid in a macro cell that is formed by a macro base station having high transmission power, there is a problem that severe interference is given from the macro base station having higher transmission power, to the small transmission power node.

The present invention has been made in view of the above, and it is therefore an object of the present invention to provide a micro base station, a user terminal and a radio communication method, which can reduce interference from a macro base station to a small transmission power node.

A micro base station according to the present invention is a micro base station which forms, in a macro cell where a radio base station transmits a signal to a terminal with first transmission power, a micro cell where the micro base station transmits a signal to a terminal under control with second transmission power, which is lower than the first transmission power, and this micro base station has: a downlink control information generating section, which generates a downlink control channel signal including downlink or uplink resource allocation information, a control section, which, in a specific subframe, shifts a transmission starting symbol of the downlink control channel signal to a position where the downlink control channel signal does not overlap a quality measurement signal that is transmitted in the macro cell, and a radio transmitting section, which transmits the downlink control signal, in which the transmission starting symbol has been shifted, by radio transmission.

By means of this configuration, it is possible to prevent a collision between a quality measurement signal that is arranged in the top symbol of a specific subframe of a macro cell, and a downlink control channel that is arranged in the top several symbols of a micro cell subframe that is synchronized with the specific subframe from, and prevent deterioration of downlink control channel demodulation.

According to the present invention, it is possible to reduce interference from a macro base station to a small transmission power node.

BRIEF DESCRIPTION OF DRAWINGS

FIGS. 2A and 1B are diagrams to show a schematic configuration of a HetNet;

FIG. 5A is a conceptual diagram in which rate matching is not performed in a system in which a macro cell and a micro cell use the same cell ID, and FIG. 5B is a conceptual diagram in which a PDCCH arrangement field is subject to rate matching in a system where a macro cell and a micro cell use the same cell ID;

DESCRIPTION OF EMBODIMENTS

Figure 6:
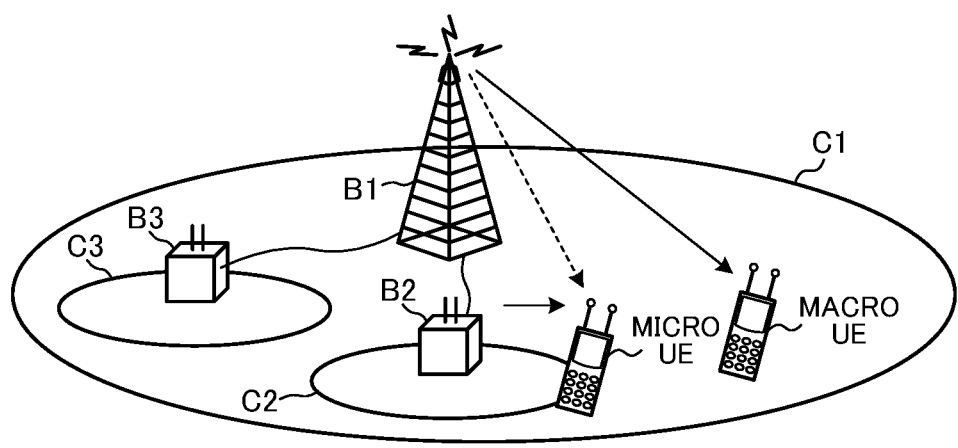
FIG. 6 is a diagram to show a schematic configuration of a HetNet.

An HetNet is a layered network, which overlays cells of various forms such as a micro cell C2 (small-sized cell: a pico cell, a femto cell, an RRH cell, and so on), on top of an existing macro cell C1 (large-sized cell), as shown in FIG. 6. In this HetNet, the downlink transmission power of the macro base station B1 of the macro cell C1, which covers a relatively wide area, is set greater than the micro base station B2 of the micro cell C2, which covers a relatively narrow area.

In this way, the HetNet is a layered network, in which the micro base station B2 having lower transmission power (and cell area) is present under the macro base station B1 having greater transmission power (and cell area). In the layered network, there is a problem that a UE that is in a cell edge of the micro cell C2 is unable to connect with the micro cell C2, although the UE is located in a close position to the micro base station B2. In the cell edge of the micro cell C2, the transmission power of the macro base station B1 is greater than the transmission power of the micro base station B2. As a result of this, the UE at the cell edge of the micro cell C2 is unable to catch the radio frames from the micro base station B2 of the pico cell C1, and connects with the macro cell C1 by catching the radio frames from the macro base station B1 of greater transmission power. This means that the original area of the micro cell C2 is invaded by the macro base station B1 and is becoming smaller.

Figure 1A:
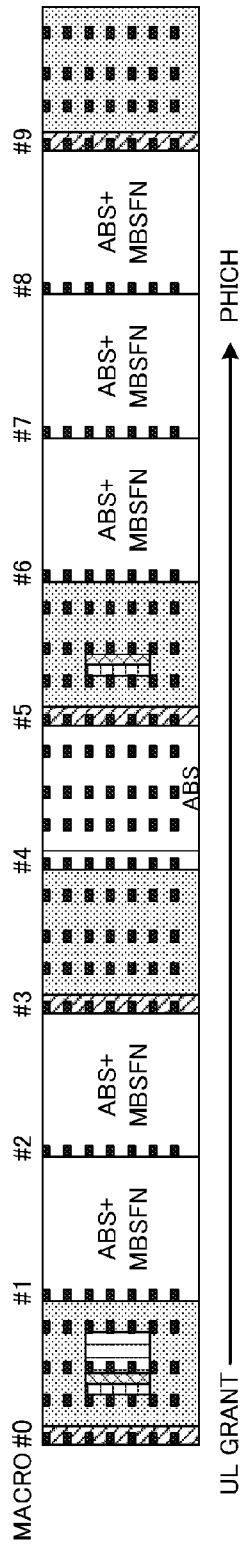
FIGS. 1A and 1B are diagrams to show interference coordination in a HetNet.
Figure 1B:
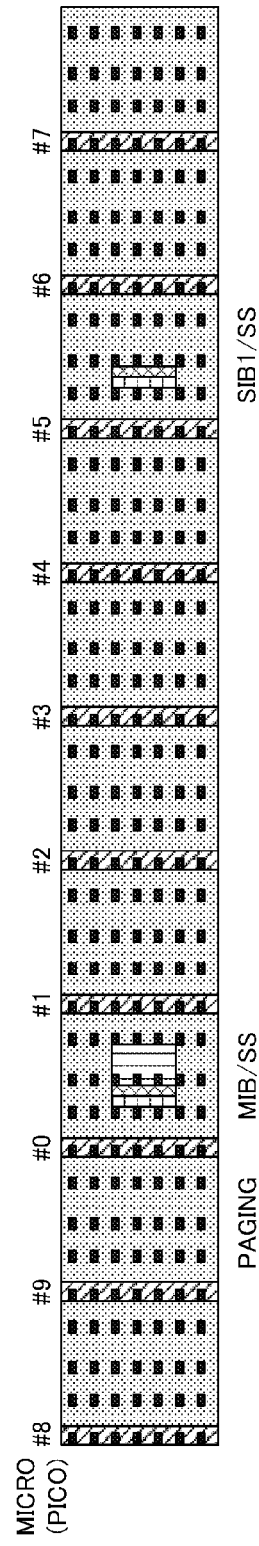

FIGS. 1A and 1B are conceptual diagrams of interference coordination for reducing interference from the macro base station B1 of greater transmission power, against the micro base station B2. In LTE, a MBSFN (Multimedia Broadcast multicast service Single Frequency Network) subframe is standardized. An MBSFN subframe is a subframe which can be made a blank period except for the control channel. A subframe (ABS: Almost Blank Subframe) to serve as a non-transmission period is provided in a radio frame to be transmitted by the macro base station B1, using an MBSFN subframe, and the radio resource of the ABS period is allocated to a micro UE that is located near the cell edge of the micro cell C2. It is possible to transmit reference signals (cell-specific reference signals (CRSs), positioning reference signals, and so on), the synchronization signal, the broadcast channel and paging, in an ABS period, but no others (the data channel and so on) are transmitted.

When the radio resource of the ABS period is assigned to the UE located near the cell edge of the micro cell C2, in the ABS period, the UE is able to connect with the micro cell C2 without being influenced by the transmission power of the macro base station B1. On the other hand, even when radio resources outside the ABS period are assigned to a UE located near the cell center of the micro cell C2, the transmission power from the micro base station B2 is greater than the transmission power from the macro base station B1, and therefore the UE is able to connect with the micro cell C2.

FIG. 1A shows the configurations of a downlink physical control channel and a downlink physical shared data channel in the macro base station B1. FIG. 1B shows the configurations of a downlink physical control channel and a downlink physical shared data channel in the micro base station B2. The transmission time units (subframes) of the macro base station B1 and the micro base station B2 are synchronized, the macro base station B1 applies an ABS, in which signals other than CRSs stop being transmitted, in specific subframe #4, to reduce interference against the micro cell C2, and, MBSFN subframes, in which the CRSs of the data field are removed, to specific subframes #1, #2, #6, #7 and #8, so that it is possible to further reduce the interference against the micro cell C2.

Now, near the cell edge of the micro cell C2, the influence of the transmission power from the macro base station B1 is significant, and yet, near the cell center of the micro cell C2, interference from the macro base station B1 is insignificant. Consequently, near the cell edge of the micro cell C2, although the received SINR increases in an ABS period, the received SINR nevertheless decreases outside the ABS period. In the following descriptions, in a micro cell subframe (TTI in a small cell such as a pico cell, a femto cell, an RRH cell and so on), a period in which signals transmitted from a small transmission power node are protected from macro interference will be referred to as a "protected subframe," and a subframe, in which no special measure is taken to protect signals transmitted from a small transmission power node from macro interference, will be referred to as a "non-protected subframe" or a "normal subframe."

FIG. 2A shows a state of a non-protected subframe sent from a macro base station to a user terminal (macro UE) under the macro base station by radio transmission. Non-protected subframes are, for example, macro cell subframe #0 and micro cell subframe #8 shown in FIGS. 1A and 1B. The macro base station B1 performs radio transmission by high transmission power, in non-protected subframes, to the macro UE. Consequently, the micro base station B2 and the micro UE suffer severe interference.

FIG. 2B shows a state of protected subframes, in which the macro base station B1 stops radio transmission to the user terminal (macro UE) under the macro base station. Protected subframes are, for example, macro cell subframe #1 and micro cell subframe #9 shown in FIGS. 1A and 1B. In protected subframes, the macro base station B1 stops transmitting the PDSCH (ABS), and, except in the top OFDM symbol, stops transmitting the CRSs (MBSFN). Consequently, interference against the micro base station B2 and the micro UE is reduced. The micro base station B2 performs radio transmission to the micro UE under the micro base station in protected subframes, so that radio communication to prevent interference from the macro base station B1 is expected to be made possible.

Now, even if the macro base station applies ABS/MBSFN subframes to specific subframes, interference from the macro base station to a small transmission power node, which is a micro base station, still remains. For example, as shown in FIG. 1A, CRSs, arranged in the top OFDM symbol of an ABS/MBSFN subframe, interfere with the top first to third OFDM symbols of a corresponding subframe of a micro cell, and damage the demodulation of the physical downlink control channel (PDCCH: Physical Downlink Control Channel) arranged in the top first to third OFDM symbols of a subframe in the micro cell. Also, when the macro base station transmits the PDCCH of uplink allocation (UL grant) in, for example, macro cell subframe #0, the macro UE to receive this PDCCH transmits uplink data four subframes later. The macro base station furthermore transmits an Ack/Nack in response to the uplink data to the macro UE in the PHICH (Physical Hybrid ARQ Indicator Channel) arranged in the top OFDM symbol in macro cell subframe #8 four subframes later. As shown in FIG. 1A, there is a possibility that an ABS subframe (subframe #8) and the PHICH collide. When an ABS subframe and the PHICH collide, the PHICH interferes with the pico cell.

The first aspect of the present invention is that, although, in a specific subframe of the macro cell, at least a downlink reference signal is arranged in the top symbol, in a synchronized specific subframe of the micro cell, the symbol starting position of the physical downlink control channel (for example, the PDCCH supported in LTE) is arranged to be shifted from the top symbol. The specific subframes are either protected subframes or non-protected subframes.

By this means, it is possible to prevent a collision of the CRSs (or the CRSs and the PHICH) arranged in the top OFDM symbol of a specific subframe (for example, ABS/MBSFN subframe) of the macro cell and the physical downlink control channel to be arranged in the top first to third OFDM symbol of a specific subframe of the micro cell, and prevent deterioration of the demodulation of the physical downlink control channel.

Figure 3:
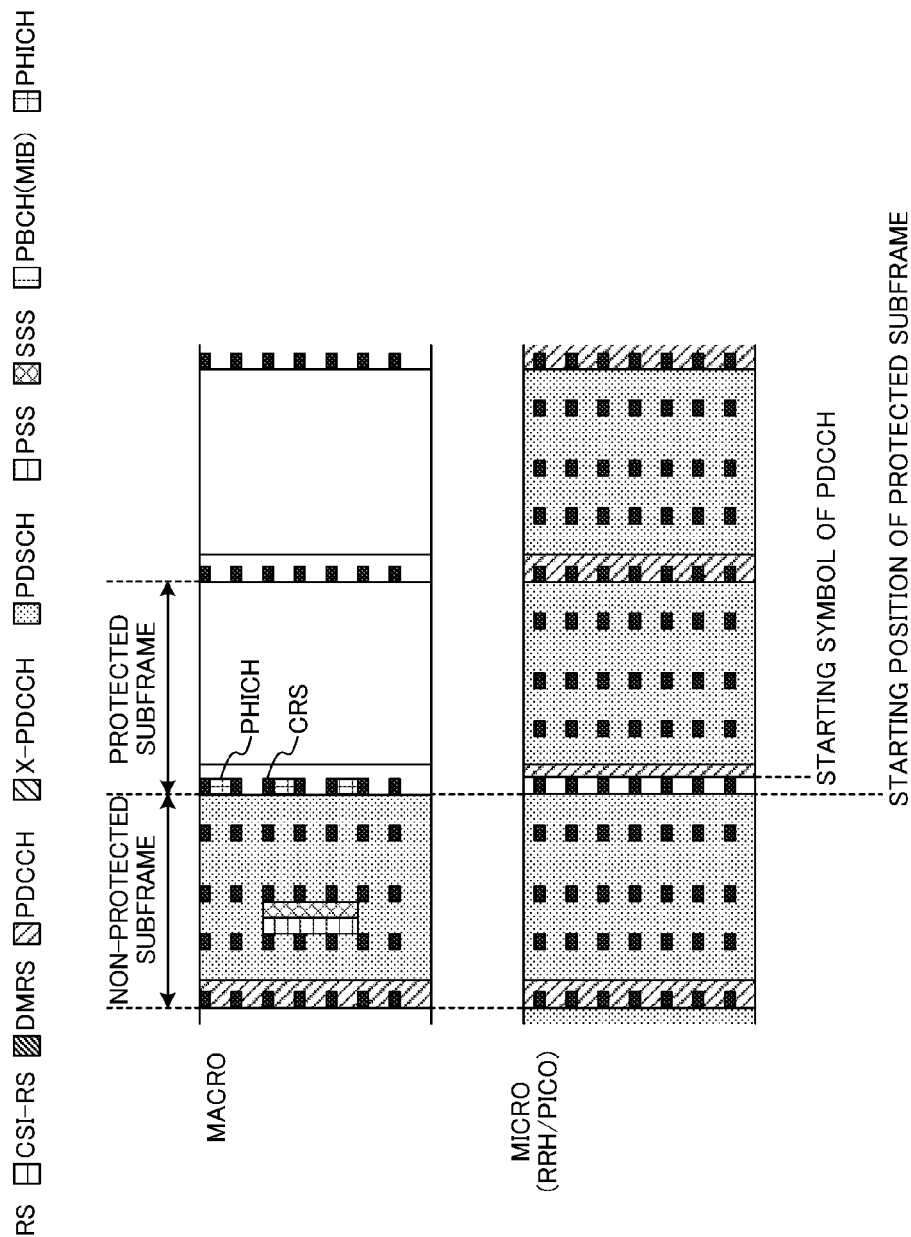
FIG. 3 is conceptual diagram in which the PDCCH starting position is shifted.

FIG. 3 is a conceptual diagram in which the PDCCH starting position in a micro cell subframe is shifted. Note that, although RRH/pico base stations are exemplified as small transmission power nodes to form micro cells, other small transmission power nodes are equally applicable. The macro cell subframe configuration will be described first. As shown in the upper part of FIG. 3, in a non-protected subframe, the PDCCH is arranged in the top first to third OFDM symbols (control field) and the PDSCH is arranged in the rest of the data field. CRSs are arranged over the entire subframe (the time domain and the frequency domain). The subcarrier positions of the CRSs shift depending on cell IDs. The synchronization signals (PSS and SSS) are multiplexed on the central six RBs (1.08 MHz). On the other hand, in a protected subframe, in an ABS+MBSFN subframe, CRSs are arranged in the top OFDM symbol alone and are not arranged in the data field. In the example shown in FIG. 3, the PHICH is multiplexed on the top OFDM symbol of the second subframe. The PHICH is used to transmit hybrid ARQ acknowledgment response, which is a response to UL-SCH (Uplink Shared Channel) transmission. To allow the hybrid ARQ protocol to operate adequately, it is necessary to keep the PHICH error rate sufficiently low. Normally, the PHICH is transmitted only in the top OFDM symbol of a subframe, so that a user terminal is able to try decoding the PHICH even when the user terminal fails to decode the PCFICH. Note that the PHICH is arranged in subframe #n+8, which is eight subframes after subframe #n in which a UL grant is transmitted.

Next, the micro cell subframe configuration will be described. As shown in the lower part of FIG. 3, in a non-protected subframe, the starting symbol of the PDCCH is changed from the top of a subframe to the second OFDM symbol. The PDCCH is arranged in the second OFDM symbol (up to the third OFDM symbol, at a maximum), which is one symbol shifted from the top OFDM symbol, and the PDSCH is arranged in the rest of the data field. Consequently, the PDCCH arranged in the micro cell subframe is protected from interference from the CRSs and the PHICH arranged in the top OFDM symbol of the macro cell-subframe. The CRSs are arranged in the top OFDM symbol. The CRSs arranged in the micro cell subframe are arranged in different subcarrier positions from the CRSs arranged in the micro cell subframe, because the macro cell and the micro cell have different cell IDs. Consequently, the micro UE is able to accurately decode the CRSs arranged in the micro cell subframe.

Note that, in the micro cell, the subframes where change of the PDCCH to shift the starting symbol of the PDCCH from the top OFDM symbol, does not have to be all protected subframes. In the example shown in FIG. 3, the PDCCH change is applied only to the subframe arranged in the middle of three subframes. The subframe to which the PDCCH change is applied may be all non-protected subframes as well.

The micro base station notifies the starting position of the PDCCH in the specific subframe where the PDCCH change is applied, to the micro UE under the micro cell. Various methods are applicable as methods of reporting the PDCCH starting position. For example, the subframe numbers to apply the PDCCH change to and the PDCCH starting position may be determined, in advance, in specifications, on a fixed basis, and a user terminal to support the specifications changes the PDCCH starting position according to the subframe numbers (for example, even numbers) and performs decoding. Also, the subframe numbers to apply the PDCCH change to and the PDCCH starting position may be reported from the micro base station to the micro UE via higher layer signaling. Use of higher layer signaling allows semi-statistic switching.

Upon receiving the specific subframe where the PDCCH change is applied, the micro UE uses the second OFDM symbol from the top as the starting symbol of the PDCCH, and performs decoding. By this means, even when the CRSs and PHICH are arranged in the top OFDM symbol of a macro cell subframe, the PDCCH of a micro cell subframe can be decoded accurately.

A second aspect of the present invention is that, in a macro cell subframe that is synchronized with a specific subframe (a protected subframe or a non-protected subframe), at least a downlink reference signal is arranged in the top symbol in a macro cell subframe, in a micro cell subframe that is synchronized with the specific subframe, a physical downlink control channel is arranged in a data field that does not overlap the control field (the top first to third symbols), and the data channel is expanded to the control field.

By this means, it is possible to prevent a collision of the CRSs (or CRSs and PHICH) that are arranged in the top OFDM symbol of a specific subframe (for example, an ABS/MBSFN subframe) of the macro cell, and the physical downlink control channel that is arranged in the data field (the field from the third OFDM symbol from the top and onward) of a micro cell subframe that is synchronized with the specific subframe, and prevent the demodulation of the physical downlink control channel in the micro cell from deteriorating. Also, since the data channel is allocated to empty resources in the control field where the PDCCH is arranged, efficient use of resources is made possible.

Figures 4A, 4B:
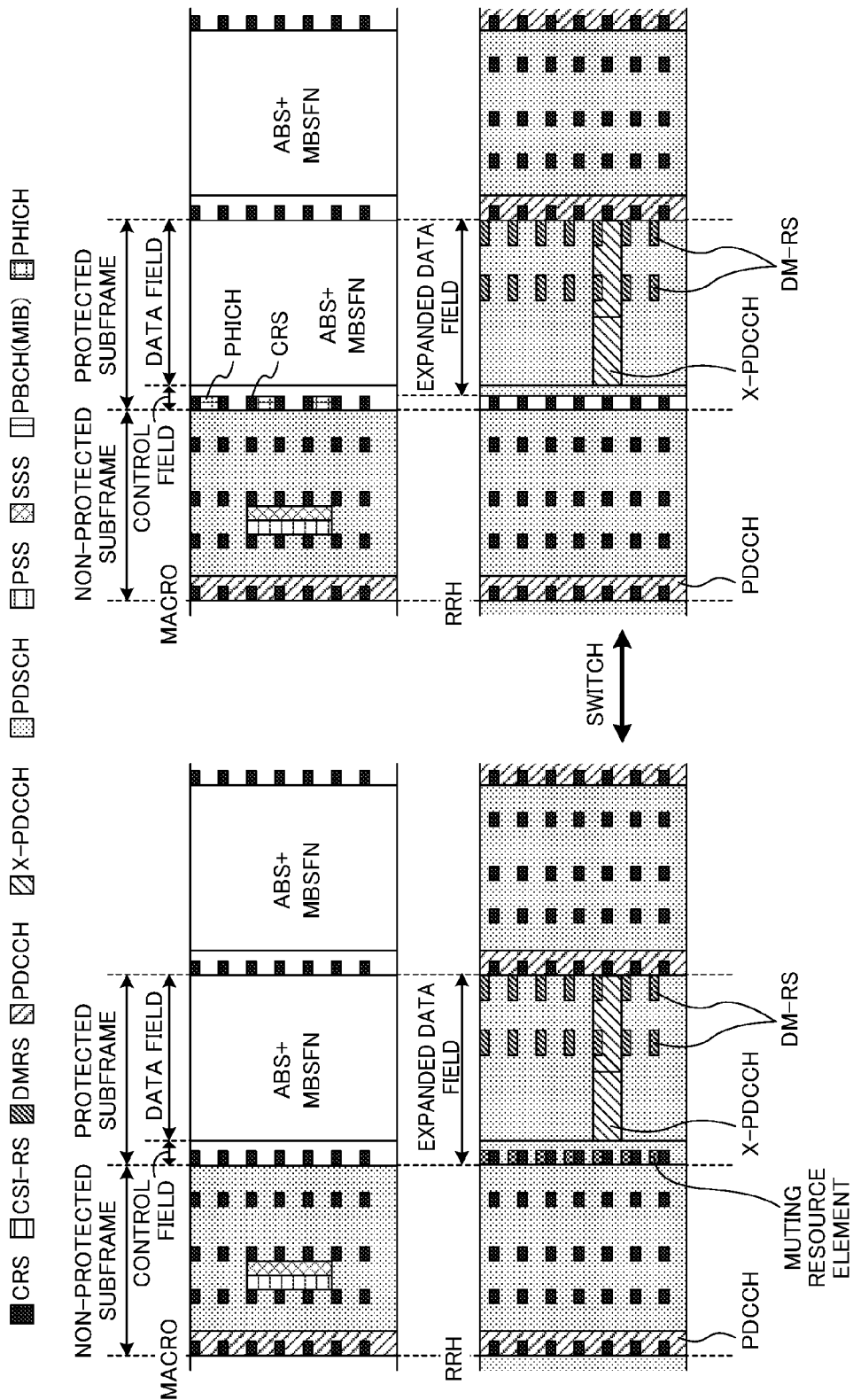
FIG. 4A is conceptual diagram in which part of resource elements is subject to rate matching in a system defining a downlink control channel in a data field.
FIG. 4B is a conceptual diagram in which the first OFDM symbol is subject to rate matching.

FIGS. 4A and 4B are conceptual diagrams in which, in a micro cell subframe, the downlink control channel is defined in the data field, and part of the data channel is arranged in the control field where the PDCCH is defined. Note that, although an RRH is exemplified as a small transmission power node to form a micro cell, other small transmission power nodes are equally applicable.

FIG. 4A shows an example of arranging a data channel (PDSCH) from the top OFDM symbol of a micro cell subframe, and FIG. 4B shows an example of arranging a data channel (PDSCH) from the second OFDM symbol of the micro cell subframe. The macro cell subframe configuration shown in the upper part of FIG. 4A is basically not different from the macro cell subframe configuration shown in the upper part of FIG. 3 described above.

In the micro cell subframe configuration shown in the lower part of FIG. 4A, a new physical channel is defined with respect to a micro cell subframe that is synchronized with the protected subframe. The newly defined physical channel will be described in detail. In the data field (the symbol field of the second or the third OFDM symbol and onward) of an existing subframe, a new physical downlink control channel (hereinafter referred to as "X-PDCCH") is defined. The X-PDCCH is allocated the resources from the end of the control field of the legacy subframe to the final symbol of that subframe, in the time domain. Also, the X-PDCCH is allocated to a plurality of subcarriers near the center of the system band, in the frequency domain. A reference signal (DM-RS: Demodulation Reference Signal) for downlink demodulation, which is one of the downlink reference signals, is arranged over the entire system band. The PDCCH is a user-specific control channel, so that the DM-RS, which is a user-specific downlink reference signal, has high affinity as a reference signal for demodulation of the X-PDCCH. However, if the X-PDCCH can be demodulated, the other downlink reference signals (CRSs and so on) can be used as well.

The data channel (PDSCH) is allocated to the control field (the field from the first OFDM symbol to the third OFDM symbol at a maximum) of an legacy subframe. It is also possible to say that the data field is expended to the first OFDM symbol of a subframe. When the macro cell and the micro cell have varying cell IDs, the subcarrier positions to arrange the CRSs also shift, so that, when a data channel is arranged in empty resource elements, interference with the CRSs transmitted in the macro cell subframe is created. Consequently, the resource elements to collide with the CRSs transmitted in the macro cell subframe (the first OFDM symbol) are muted. The capacity in which the data channel can be allocated decreases for the number of resource elements to be muted. So, the RRH (micro base station) performs rate matching of the resource elements to be muted, and encodes the data channel into an amount of data to match the capacity secured for data channel transmission.

The RRH (micro base station) reports the specific subframe to which the X-PDCCH is applied, and muting resource elements, to the micro UE under the micro cell. Identification information of the rate matching scheme can be transmitted by the X-PDCCH. Various methods are applicable as methods of reporting the specific subframe to which the X-PDCCH is applied. For example, the subframe number to apply the X-PDCCH to may be determined in advance, by specifications, on a fixed basis, and a user terminal to support the specifications may decode the X-PDCCH in accordance with the subframe numbers (for example, even numbers), switch the rate matching method of the data channel and decode (performs de-rate matching of) the data channel. Also, the subframe numbers to apply the X-PDCCH to may be reported from the RRH (micro base station) to the micro cell UE via higher layer signaling. Use of higher layer signaling allows semi-statistic switching.

Upon receiving the specific subframe where the X-PDCCH is applied, the micro cell UE receives the X-PDCCH from the top symbol (the third or fourth OFDM symbol) of the data field and performs decoding. The rate matching method (identification information) included in the X-PDCCH is acquired, and, by applying de-rate matching corresponding to the rate matching method, the data channel is demodulated.

FIG. 4B shows an example of arranging the data channel (PDSCH) from the second OFDM symbol of the micro cell subframe. The macro cell subframe configuration shown in the upper part of FIG. 4B is the same as the macro cell subframe configuration shown in the upper part of FIG. 3.

In the micro cell subframe configuration shown in the lower part of FIG. 4B, the X-PDCCH, which is a physical channel, is newly defined with respect to a micro cell subframe that is synchronized with a protected subframe. As has been described with reference to FIG. 4A, the X-PDCCH is allocated the resources from the end of the control field of an legacy subframe to the final symbol of that subframe, in the time domain. Also, the X-PDCCH is allocated to a plurality of subcarriers near the center of the system band, in the frequency domain.

On the other hand, the data channel (PDSCH) is allocated up to the second OFDM symbol, which serves as the control field, in an legacy subframe. It is also possible to say that the data field is expanded to the second OFDM symbol of a subframe. As shown in FIG. 4B, in a specific subframe in a macro cell, there is a possibility that the PHICH is arranged in the first OFDM symbol. In that specific subframe, CRSs and PHICH are multiplexed on the first OFDM symbol, so that there is severe interference against the first OFDM symbol of the micro cell subframe. So, in a specific subframe (in the present example, a protected subframe) where CRSs and PHICH are arranged in the first OFDM symbol of a macro cell subframe, it is preferable to expand the data channel (PDSCH) to the second OFDM symbol.

The capacity in which the data channel can be allocated decreases for the number of resource elements of the first OFDM symbol. So, the RRH (macro base station) subjects all of the first OFDM symbol to rate matching and encodes the data channel into an amount to match the capacity secured for data channel transmission.

The RRH (micro base station) reports the specific subframe to which the X-PDCCH is applied, to the micro UE under the micro cell. Identification information of the rate matching scheme can be transmitted by the X-PDCCH. Various methods are applicable as methods of reporting the specific subframe to apply the X-PDCCH to.

Upon receiving the specific subframe where the X-PDCCH is applied, the micro UE receives and decodes the X-PDCCH from the top symbol (the second OFDM symbol) of the data filed. The rate matching method included in the X-PDCCH (identification information) is acquired, and, by applying de-rate matching to correspond to the rate matching method, the data channel is demodulated.

The rate matching to support the interference coordination shown in FIG. 4A will be referred to as "the first rate matching method," and the rate matching to support the interference coordination shown in FIG. 4B will be hereinafter referred to as "the second rate matching method." The macro base station handles the baseband processing of the physical channel signal to be transmitted from the RRH in the macro base station, so that it is possible to select between the interference coordination shown in FIG. 4A and the interference coordination shown in FIG. 4B on a dynamic basis. In this case, in accordance with the selection of interference coordination, the rate matching method needs to be switched as well, but if the macro base station handles this, it is possible to switch between the first rate matching method and the second rate matching method quickly, on a dynamic basis. Note that a pico base station, which is a small transmission power node, is connected with the macro base station via an X2 interface, and therefore is able to switch rate matching.

FIGS. 5A and 5B are conceptual diagrams of defining a downlink control channel in a data field and arranging part of a data channel in a control field, showing an example where the macro cell and the micro cell use the same cell ID. When a macro cell and a micro cell use the same cell ID, the micro cell transmits the same CRSs and PDCCH as the macro cell. However, the present invention is not limited to the case of using the same cell ID, and is applicable to cases of using different cell IDs.

In FIG. 5A, in a specific subframe (a protected subframe in the present example), in the macro cell, CRSs are transmitted in the first OFDM symbol, and, in the micro cell, too, CRSs are arranged in the same resource as in the macro cell. The RRH arranges the X-PDCCH in the data field of a micro cell subframe, and executes scheduling such that the data channel (PDSCH) is expanded to the first OFDM symbol. In this case, given that the resource elements where CRSs are arranged are the same as in the macro cell, the resource elements to be muted in the control field of the micro cell subframe are CRSs alone. At this time, rate matching is applied only to the CRSs of the control field.

In FIG. 5B, although, in a specific subframe (a protected subframe in the present example), although, in the macro cell, CRSs are transmitted in the first OFDM symbol and furthermore the PDCCH is also transmitted, in the micro cell, CRSs and PDCCH are also arranged in the same resource as in the macro cell. The macro base station, for example, does not transmit the PDCCH in a protected subframe, but the macro base station does not prohibit this completely, and, instead, as shown in the macro cell subframe of FIG. 5B, the macro base station is preferably able to transmit the PDCCH in protected subframes when necessary. The RRH arranges the X-PDCCH in the data field of the micro cell subframe, arranges CRSs and PDCCH in the original control field up to the third OFDM symbol at a maximum, and schedules the data channel (PDSCH) from the top of the data field, which starts from the end of the PDCCH. In this case, the capacity decreases below the basic capacity of the data channel for the resource elements where the PDCCH is arranged. Consequently, as shown in FIG. 5B, when the data channel is started from the end of the PDCCH, the whole of the PDCCH arrangement field is subject to rate matching. That is to say, the RRH (micro base station) performs rate matching for all of the arrangement field of the PDCCH, and encodes the data channel to match the capacity secured for data channel transmission.

The rate matching to support the interference coordination shown in FIG. 5A will be referred to as "the third rate matching method," and the rate matching to support the interference coordination shown in FIG. 5B will be hereinafter referred to as "the fourth rate matching method." The macro base station handles the baseband processing of the physical channel signal to be transmitted from the RRH in the macro base station, so that the macro base station is able to select between the interference coordination shown in FIG. 5A and the interference coordination shown in FIG. 5B on a dynamic basis, and switch between the third rate matching method and the fourth rate matching method quickly. Note that a pico base station, which is a small transmission power node, is connected with the macro base station via an X2 interface, and therefore is able to switch rate matching.

Also, the above X-PDCCH is not only applicable to a micro cell subframe that is synchronized with a protected subframe, but is also applicable to a micro cell subframe that is synchronized with a non-protected subframe.

The present invention is applicable to the LTE/LTE-A system, which is one next generation mobile communication system. First, an overview of the LTE/LTE-A system will be described. Note that, in the following descriptions, a fundamental frequency block will be described as a component carrier.

In the present system, an LTE-A system, which is the first communication system having the first system band that is formed with a plurality of component carriers and that is relatively wide, and an LTE system, which is a second communication system having a second system band that is relatively narrow (and that is formed with one component carrier here), coexist. In the LTE-A system, radio communication is carried out using a variable system bandwidth of maximum 100 MHz, and, in the LTE system, radio communication is carried out in a variable system bandwidth of maximum 20 MHz. The system band of the LTE-A system is at least one fundamental frequency block (component carrier: CC), where the system band of the LTE system is one unit. Coupling a plurality of fundamental frequency blocks into a wide band as one in this way is referred to as "carrier aggregation."

For radio access schemes, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and placing data on each frequency band. SC-FDMA is a single carrier transmission scheme to reduce interference between terminals by dividing, per terminal, the system band into bands formed with one or continuous resource blocks, and allowing a plurality of terminals to use mutually different bands.

Here, channel configurations in the LTE system will be described. Downlink channel configurations will be described first. The downlink channels include a PDSCH (Physical Downlink Shared Channel), which is used by user terminals in a cell on a shared basis, as a downlink data channel, and downlink L1/L2 control channels (PDCCH, PCFICH, and PHICH). Transmission data and higher control information are transmitted by the PDSCH. The scheduling information of the PDSCH, the PUSCH and so on are transmitted by the PDCCH (Physical Downlink Control Channel). The number of OFDM symbols to use for the PDCCH is transmitted by the PCFICH (Physical Control Format Indicator Channel). HARQ ACK/NACK for the PUSCH are transmitted by the PHICH (Physical Hybrid-ARQ Indicator Channel).

Uplink channel configurations will be described. The uplink channels include a PUSCH (Physical Uplink Shared Channel), which is used by user terminals in a cell on a shared basis as an uplink data channel, and a PUCCH (Physical Uplink Control Channel), which is an uplink control channel. By means of this PUSCH, transmission data and higher control information are transmitted. Also, by the PUCCH, the CSI, which is received quality information measured from downlink reference signals (CSI-RS and CRS), downlink radio quality information (CQI: Channel Quality Indicator), ACK/NACK, and so on are transmitted.

Now, a radio communication system according to an embodiment of the present invention will be described in detail. Note that the radio communication system shown in FIG. 6 is a system to accommodate, for example, the LTE system or SUPER 3G. This radio communication system uses carrier aggregation, which makes a plurality of fundamental frequency blocks, in which the system band of the LTE system is one unit, as one. Also, this radio communication system may be referred to as "IMT-Advanced" or "4G."

The macro base station B1 is connected with an upper station apparatus, and this upper station apparatus is connected with a core network. The channels are controlled such that a macro UE under the macro base station B1 is able to communicate with the macro base station B1, and a micro UE under the micro base station B2 is able to communicate with the micro base station B2. Note that the upper station apparatus includes, for example, an access gateway apparatus, a radio network controller (RNC), a mobility management entity (MME) and so on, but is by no means limited to these. The user terminal (macro UE/micro UE) supports LTE/LTE-A, unless specified otherwise.

Figure 7:
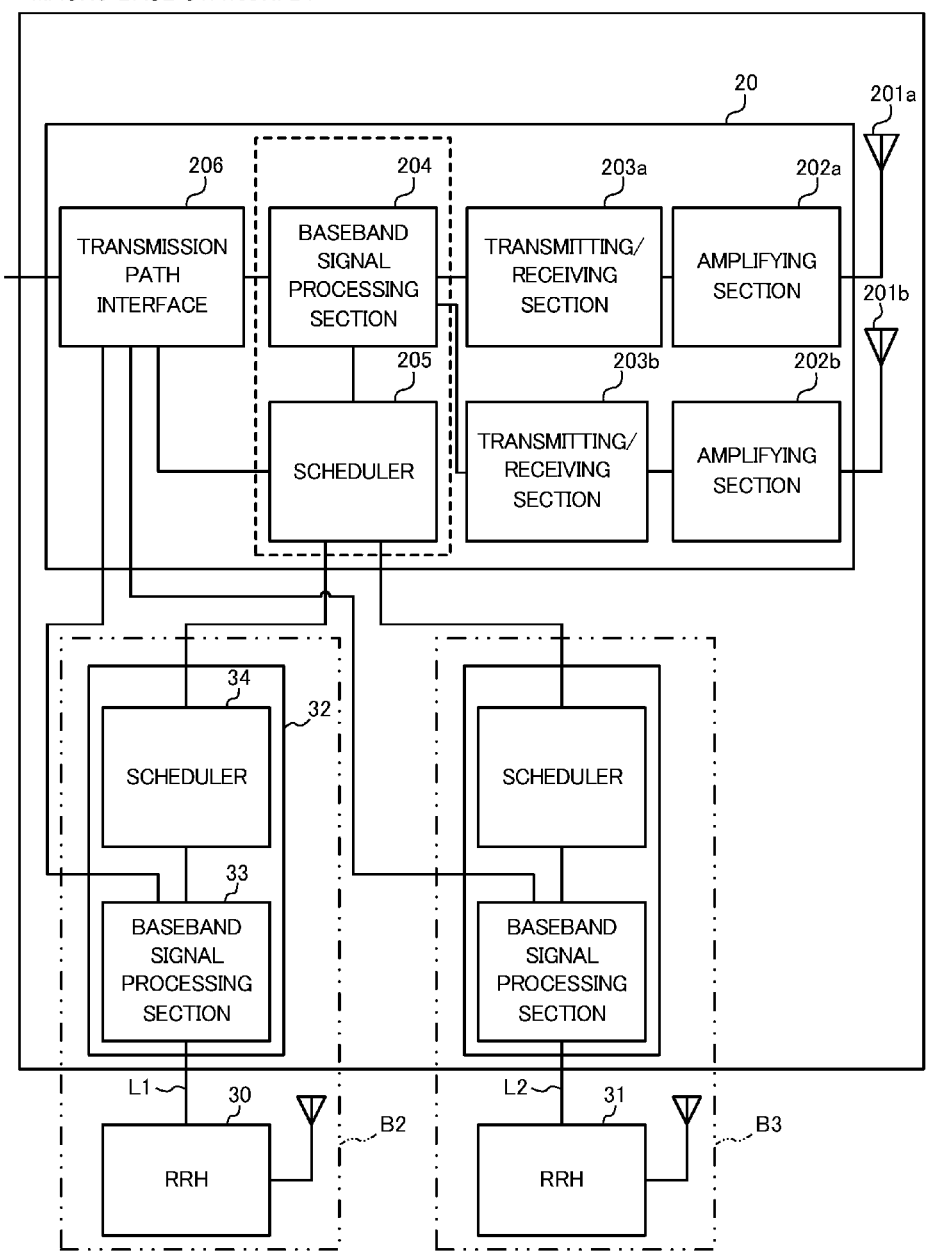
FIG. 7 is a functional block diagram of a macro base station and a micro base station (RRH)

With reference to FIG. 7, overall configurations of the macro base station and the micro base station (RRH) according to the present embodiment will be described. The macro base station B1 includes a macro base station section 20 for communicating with user terminals under the macro cell, and part of the functional elements (functional sections, not including the functions of the radio part) of RRHs 30 and 31 (micro base stations B2 and B3 shown in FIG. 6, and so on) connected with the macro base station B1 by cables L1 and L2, which are, for example, optical fiber and/or the like.

The macro base station section 20 has a transmitting/receiving antennas 201a and 201b, amplifying sections 202a and 202b, transmitting/receiving sections 203a and 203b, a baseband signal processing section 204, a scheduler 205, and a transmission path interface 206. Transmission data that is transmitted from the macro base station section 20 to a user terminal is input from an upper station apparatus to the baseband signal processing section 204 via the transmission path interface 206.

The baseband signal processing section 204 applies the following processes to the downlink data channel signal. That is, for example, a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process, are performed. Furthermore, as for the signal of the physical downlink control channel, which is a downlink control channel, transmission processes such as channel coding and inverse fast Fourier transform are performed.

Also, the baseband signal processing section 204 notifies control information for allowing each user terminal to communicate with the macro base station section, to the user terminals connected with the same cell, by a broadcast channel. Broadcast information for allowing communication in the macro cell includes, for example, the uplink or downlink system bandwidth, identification information of a root sequence (root sequence index) for generating random access preamble signals in the PRACH, and so on.

In the transmitting/receiving sections 203 and 203b, baseband signals that are output from the baseband signal processing section 204 is subjected to frequency conversion into a radio frequency band. The transmission signals having been subjected to frequency conversion are amplified in the amplifying sections 202a and 202b and output to the transmitting/receiving antennas 201a and 201b.

Meanwhile, as for signals to be transmitted on the uplink from the user terminal to the macro base station section 20, radio frequency signals that are received in the transmitting/receiving antennas 201a and 201b are amplified in the amplifying sections 202a and 202b, subjected to frequency conversion and converted into baseband signals in the transmitting/receiving sections 203a and 203b, and are input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signals received on the uplink. The decoded signals are transferred to the upper station apparatus through the transmission path interface 206. Note that a call processing section is included as a functional element related to speech communication. The call processing section performs call processes such as setting up and releasing communication channels, manages the state of the macro base station section 20 and manages the radio resources.

The micro base station B2 is formed with an RRH 30, which is placed in a hot spot and/or the like, distant from the macro base station B1, a cable L1, which is, for example, an optical cable, to connect the RRH 30 to the macro base station B1, and a control/baseband section 32, which is provided inside the macro base station B1. The control/baseband section 32 basically constitutes the same functional sections as the functional sections of the macro base station section 20, not including the radio section, and has a baseband signal processing section 33, and a scheduler 34 which controls the resource allocation of the micro UE under the micro cell and which also co-operates with the scheduler 205 of the macro base station B1. Another micro base station B3 has the same configuration as the micro base station B2.

Figure 8:
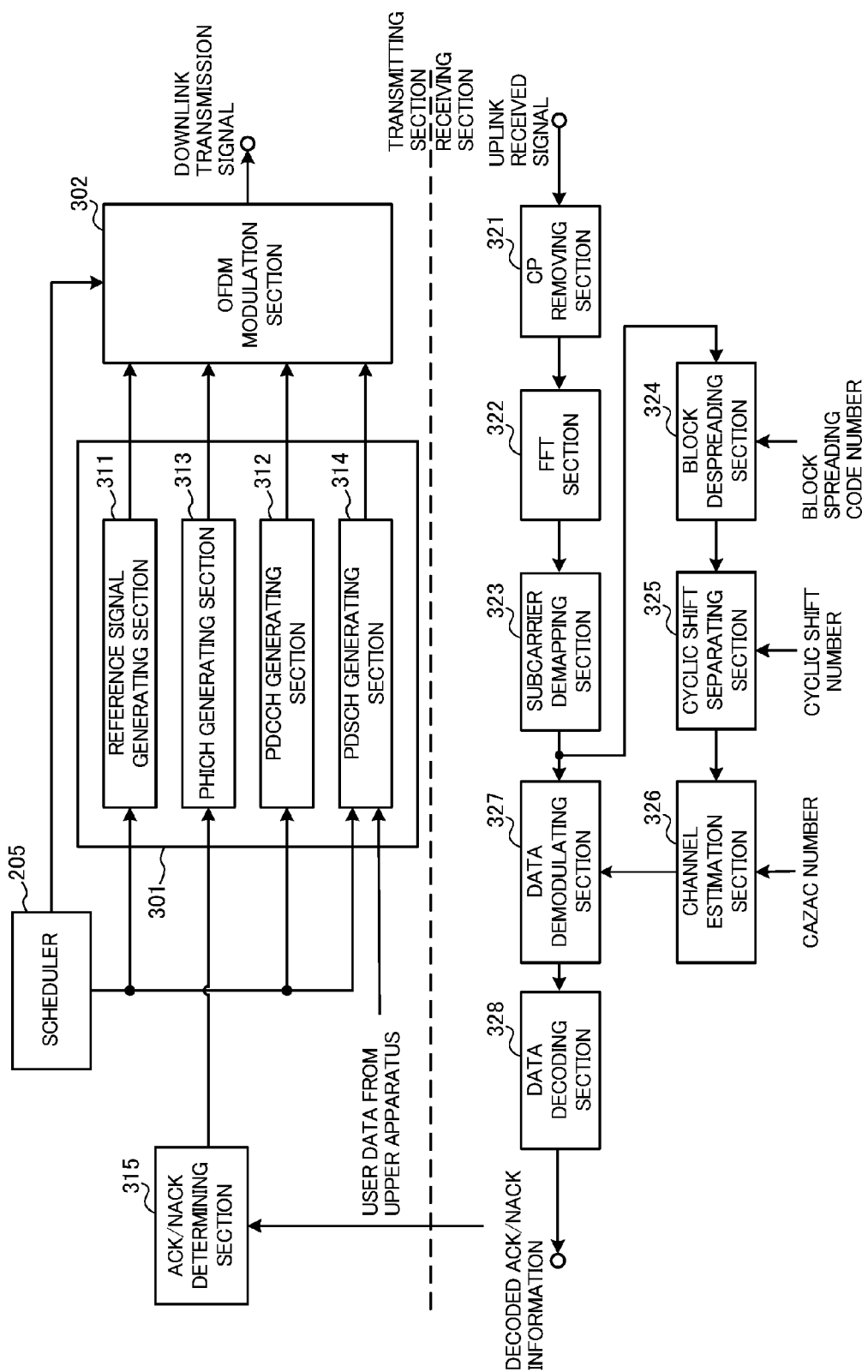
FIG. 8 is a detailed functional block diagram of a base station.

FIG. 8 is a functional block diagram of a baseband signal processing section 204 provided in the macro base station section 20. The baseband signal processing section 204 has a transmitting section and a receiving section. The transmitting section of the baseband signal processing section 204 has a channel signal generating section 301, which generates a channel signal of a downlink physical channel, and an OFDM modulation section 302, which performs OFDM modulation of the channel signal of the downlink physical channel generated in the channel signal generating section 301.

The channel signal generating section 301 has a reference signal generating section 311, a PDCCH generating section 312, a PHICH generating section 313, and a PDSCH generating section 314. The reference signal generating section 311 generates downlink reference signals (CRS, UE-specific RS, DM-RS, CSI-RS and so on). The reference signal generating section 311 is given MBSFN subframe information from the scheduler 205, and does not generate CRSs to be arranged in the data field in an MBSFN subframe. The PDCCH generating section 312 generate a DCI (downlink scheduling assignment, uplink scheduling grant), which is downlink control information. The PHICH generating section 313 generates an ACK/NACK in response to the user data received on the uplink. The PDSCH generating section 314 generates a data channel signal, which is downlink user data. Note that the PHICH generating section 313 is given an ACK/NACK detection result with respect to user data received on the uplink, from the ACK/NACK detection section 315. Based on the content of the retransmission command input from the upper station apparatus, the scheduler 205 schedules the uplink and downlink control signals and uplink and downlink shared channel signals with reference to these channel estimation value and CQI.

Figure 9:
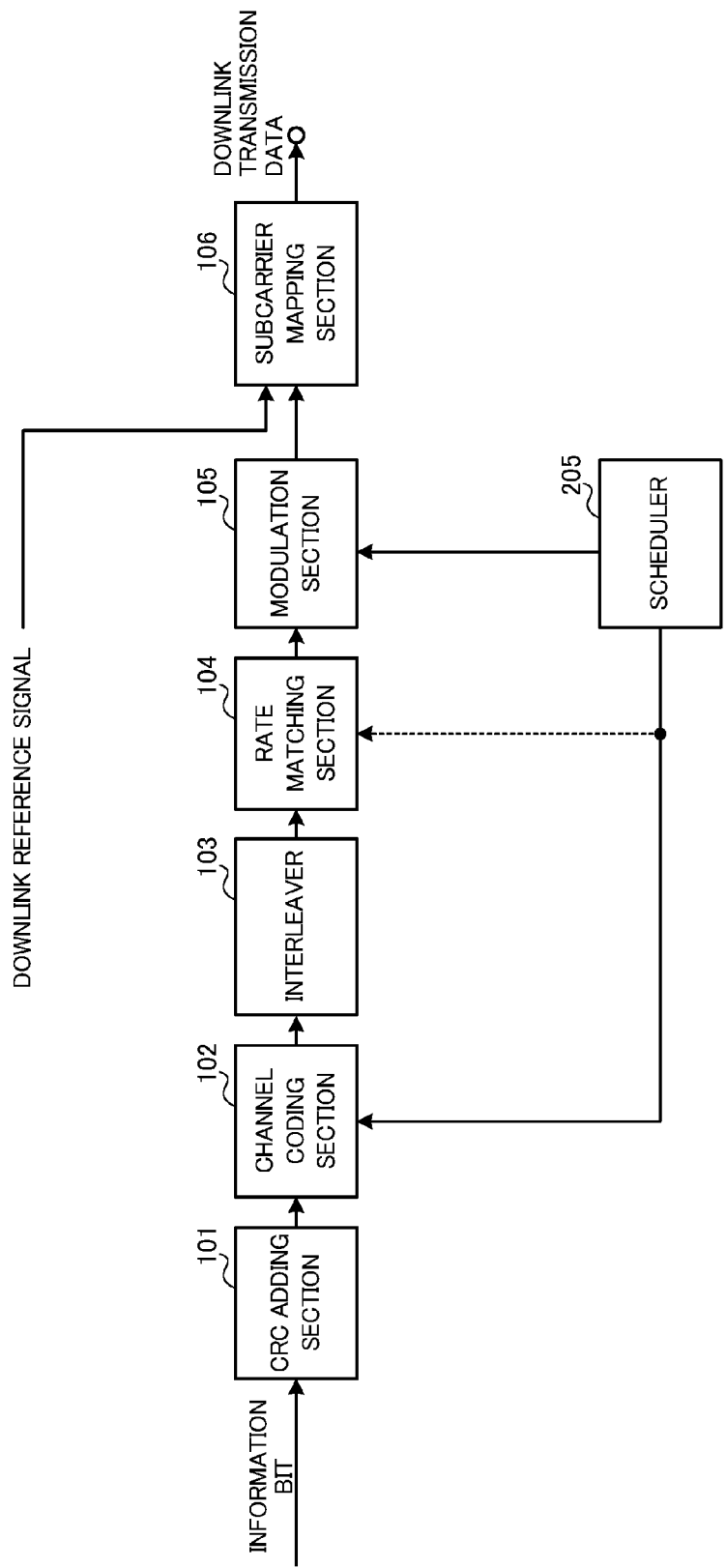
FIG. 9 is a functional block diagram of an OFDM modulation section in a base station.

The OFDM modulation section 302 generates a downlink transmission signal by mapping downlink signals, which includes other downlink channel signals and uplink resource allocation information signal, to subcarriers, performs an inverse fast Fourier transform (IFFT), and add CPs. FIG. 9 shows the function blocks of the OFDM modulation section 302. The OFDM modulation section 302 is configured to include a CRC adding section 101, a channel coding section 102, an interleaver 103, a rate matching section 104, a modulation section 105, and a subcarrier mapping section 106. The CRC adding section 101 adds CRC bits for error check in packet data units, to information bits that are input. Here, CRC bits that are 24-bit long are added to the information bits. Also, the CRC adding section 101 adds CRC bits, per code block after code block segmentation. The channel coding section 102 encodes packet data including the CRC bits, using a predetermined coding scheme, at a predetermined coding rate. To be more specific, the channel coding section 102 performs Turbo coding at a coding rate of 1/3, and acquires coded bits. The packet data is encoded into systematic bits, and parity bits which are error control bits for these systematic bits. The coding rate is designated from the scheduler 205. Although a case will be described here where Turbo coding of a coding rate 1/3 is used, it is equally possible to use other coding rates and other coding schemes as well. The interleaver 103 rearranges the order of the coded bits after channel coding randomly (interleaving process). The interleaving process is executed to minimize the data transmission loss due to burst errors. The rate matching section 104 performs rate matching of the coded bits by performing repetition and puncturing for the coded bits. For example, the rate matching section 104 performs puncturing when the coded bit length KW after channel coding is greater than the coded bit length E after rate matching, and performs repetition when the coded bit length KW after channel coding is smaller than the coded bit length E after rate matching. The modulation section 105 modulates the coded bits input from the rate matching section 104 by a predetermined modulation scheme. Note that the modulation scheme used in the modulation section 105 is given from the scheduler 205. The modulation scheme may be, for example, QPSK (Quadrature Phase Shift Keying), 8PSK, 16QAM (Quadrature Amplitude Modulation), and 64QAM. The coded bits modulated by the modulation section 105 are transmitted to the mobile terminal apparatus UE on the downlink as transmission data.

The scheduler 205 determines the coding rate in the channel coding section 102 and the modulation scheme in the modulation section 107 according to the current radio channel state. Also, the scheduler 205 performs retransmission control in accordance with response signals (ACK/NACK) transmitted from user terminal. When a response signal ACK (Acknowledge) is received, the corresponding transmission packets in a buffer memory are removed. On the other hand, when a response signal NACK (Non-Acknowledge) is received, part or all of the corresponding transmission packets in the buffer memory are extracted, and retransmitted to the user terminal via the modulation section 105.

The receiving section of the baseband signal processing section 204 has a CP removing section 321, which removes the CPs from a received signal, an FFT section 322, which performs a fast Fourier transform (FFT) of the received signal, a subcarrier demapping section 323, which demaps the signal after the FFT, a block despreading section 324, which despreads the signal after subcarrier demapping by a block spreading code (OCC), a cyclic shift separating section 325, which separates the target user signal by removing the cyclic shift from the signal after the despreading, a channel estimation section 326, which performs channel estimation with respect to the demapped signal after user separation, a data demodulation section 327, which performs data demodulation of the signal after subcarrier demapping using the channel estimation value, and a data decoding section 328, which performs data decoding of the signal after data demodulation.

The CP removing section 321 removes the parts corresponding to the CPs and extracts the effective signal part. The FFT section 322 performs an FFT of the received signal and converts the signal into a frequency domain signal. The FFT section 322 outputs the signal after the FFT to the subcarrier demapping section 323. The subcarrier demapping section 323 extracts the ACK/NACK signal, which is an uplink control channel signal, from the frequency domain signal, using resource mapping information. The subcarrier demapping section 323 outputs the extracted ACK/NACK signal to the data demodulation section 327. The subcarrier demapping section 327 outputs the extracted reference signals to the block despreading section 324. The block despreading section 324 despreads the received signals that have been orthogonal-multiplexed using an orthogonal code (OCC) (block spreading code), using the orthogonal code that is used in the user terminal. The block despreading section 324 outputs the despread signal to the cyclic shift separating section 325. The cyclic shift separating section 325 separates the control signals that have been orthogonal-multiplexed using cyclic shifting, using cyclic shift numbers. Uplink control channel signals from the user terminals are subjected to cyclic shifting, in varying amounts of cyclic shift, on a per user basis. Consequently, by applying a cyclic shift in the opposite direction in the same amount of cyclic shift as the amount of cyclic shift used in the user terminal, it is possible to separate the control signals for the user targeted for the receiving process. The channel estimation section 326 separates the reference signals, orthogonal-multiplexed using cyclic shifting and orthogonal code, using cyclic shift number and also using OCC numbers if necessary. The channel estimation section 326 applies a cyclic shift in the opposite direction using an amount of cyclic shift corresponding to the cyclic shift number. Also, despreading is performed using the orthogonal code corresponding to the OCC number. By this means, it is possible to separate the user signal (reference signal). Also, the channel estimation section 326 extracts the reference signals received from the frequency domain signal using the resource mapping information. Then, channel estimation is performed by determining the correlation between the CAZAC code sequence corresponding to the CAZAC number and the CAZAC code sequence that is received. The data demodulation section 327 demodulates data based on the channel estimation value from the channel estimation section 326. Also, the data decoding section 328 performs data decoding of the ACK/NACK signals after demodulation and outputs the result as ACK/NACK information.

Based on this ACK/NACK information, the macro base station 20 determines transmitting a new PDSCH to the user terminal or retransmitting the PDSCH that has been transmitted.

Next, the function blocks of the micro base station B2 will be described. The RRH 30, which is one of the components to constitute the micro base station B2, has antennas 201a and 201b, amplifying sections 202a and 202b, transmitting/receiving sections 203a and 203b, which constitute the radio section of the macro base station section 20.

The baseband signal processing section 33 of the micro base station B2 has basically the same functional configuration as the baseband signal processing section 204 of the macro base station section 20. Although, in the following description, the function blocks of the baseband signal processing section 33 of the micro base station B2 will be assigned the same codes as the codes assigned to the function blocks of the baseband signal processing section 204 of the macro base station section 20, "(B2)" will be assigned behind the codes for distinction from the macro base station section 20. That is to say, the transmitting section of the baseband signal processing section 33 of the micro base station B2 has a channel signal generating section 301 (B2), which generates a channel signal of a downlink physical channel, and an OFDM modulation section 302 (B2), which performs OFDM modulation of the channel signal of the downlink physical channel generated in the channel signal generating section 301 (B2).

The channel signal generating section 301 (B2) has a reference signal generating section 311 (B2), a PDCCH generating section 312 (B2), a PHICH generating section 313 (B2), and a PDSCH generating section 314 (B2). Also, upon receiving a command from the scheduler 34, the PDSCH generating section 314 (B2) sends information related to the PDCCH starting position by higher layer signaling. Also, in response to a command from the scheduler 34, the PDCCH generating section 312 (B2) applies the X-PDCCH to a specific subframe. At this time, as described above, to switch between several rate matching methods dynamically, identification information of the rate matching method to be applied is added to the downlink control information. The PDCCH generating section 312 (B2) shifts the PDCCH starting position according to a command from the scheduler 34 (FIG. 3). The operation of the OFDM modulation section 302 (B2) is different from the OFDM modulation section 302 of the rate matching section 104. As shown by dotted lines in FIG. 9, in the OFDM modulation section 302 (B2), the scheduler 205 designates the rate matching method (FIGS. 4A and 4B and FIGS. 5A and 5B) to the rate matching section 104 (B2). The rate matching section 104 (B2) switches the rate matching method dynamically in accordance with commands from the scheduler 205. The designation of the rate matching method is given from the scheduler 205 of the macro base station B1, to the scheduler 34 of the micro base station B2. The scheduler 205 and the scheduler 34 are elements that are embedded in the same site of the macro base station B1 and are therefore capable of dynamic cooperation.

Figure 10:
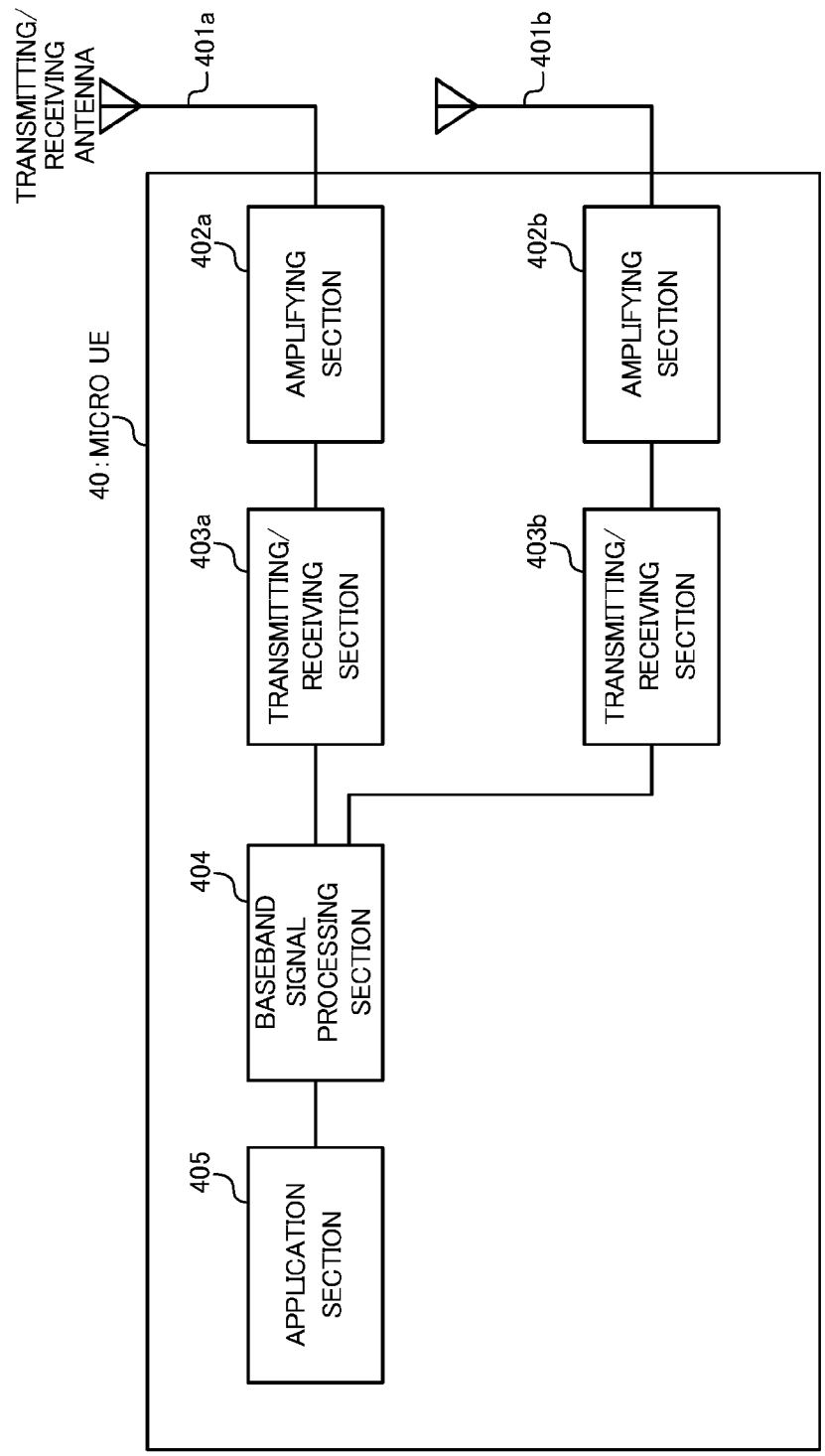
FIG. 10 is a functional block diagram of a user terminal.

Next, an overall configuration of a user terminal according to the present embodiment will be described with reference to FIG. 10. A user terminal 40 constituting a micro UE has a plurality of transmitting/receiving antennas 401a and 401b, amplifying sections 402a and 402b, transmitting/receiving sections 403a and 403b, a baseband signal processing section 404, and an application section 405.

Radio frequency signals received in the transmitting/receiving antennas 401a, and 401b are amplified in the amplifying sections 402a and 402b, and, in the transmitting/receiving sections 403a and 403b, are subjected to frequency conversion and converted into a baseband signal. This baseband signal is subjected to receiving processes such as an FFT process, error correction decoding and retransmission control, in the baseband signal processing section 404. In this downlink data, downlink user data is transferred to the application section 405. The application section 405 performs processes related to upper layers above the physical layer and the MAC layer. Also, in the downlink data, broadcast information is also transferred to the application section 405.

On the other hand, uplink user data is input from the application section 405 to the baseband signal processing section 404. The baseband signal processing section 404 performs a retransmission control (HARQ) transmission process, channel coding, a DFT process, and an IFFT process. The baseband signal output from the baseband signal processing section 404 is converted into a radio frequency band in the transmitting/receiving section 403. After that, the amplifying sections 402a and 402b performs amplification and transmits the result from the transmitting/receiving antennas 401a and 401b.

Figure 11:
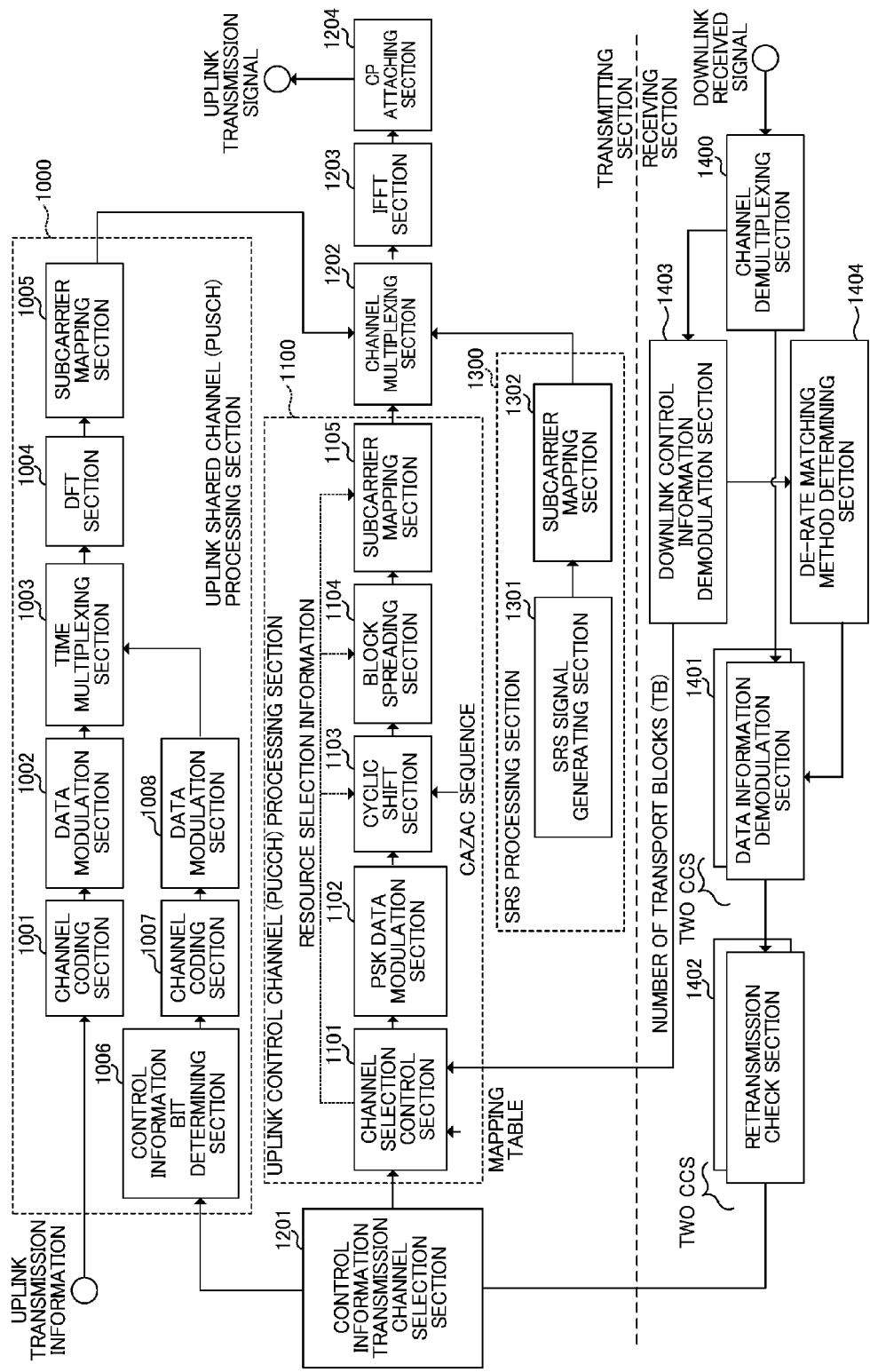
FIG. 11 is a detailed functional block diagram of a user terminal.

FIG. 11 shows the function blocks of a user terminal in detail. In the following description, a case will be described where, when uplink control information is transmitted on the uplink from a user terminal apparatus, a plurality of users are orthogonal-multiplexed using cyclic shifting of a CAZAC code sequence, and retransmission acknowledgement signals, which are feedback control information, are transmitted. Note that, although, in the following description, a case will be shown where retransmission acknowledgement signals in response to a downlink shared channel received from two CCs are transmitted, the number of CCs is not limited to this.

A user terminal 40 has a transmitting section and a receiving section. The receiving section of the user terminal 40 has a channel demultiplexing section 1400, which demultiplexes a received signal into control information and the data signal, a data information demodulation section 1401, which demodulates an OFDM signal, a retransmission check section 1402, which checks retransmission with respect to a downlink shared channel signal and outputs a retransmission acknowledgement signal, a downlink control information demodulation section 1403, which demodulates downlink control information, and a de-rate matching method determining section 1404, which determines the rate matching method related to the received downlink shared channel signal and determines the de-rate matching method. Meanwhile, the transmitting section of the user terminal 40 has a control information transmission channel selection section 1201, an uplink shared channel (PUSCH) processing section 1000, an uplink control channel (PUCCH) processing section 1100, an SRS processing section 1300, a channel multiplexing section 1202, an IFFT section 1203, and a CP attaching section 1204.

The data information demodulation section 1401 receives and demodulates a downlink OFDM signal. That is to say, the data information demodulation section 1401 removes the CPs from the downlink OFDM signal, performs a fast Fourier transform, extracts the subcarriers where a BCH signal or a downlink control signal is allocated, and performs data demodulation. When downlink OFDM signals are received from a plurality of CCs, data is demodulated on a per CC basis. The data information demodulation section 1401 outputs the downlink signal after data demodulation, to the retransmission check section 1402.

The retransmission check section 1402 determines whether or not a downlink shared channel signal (PDSCH signal) that is received has been received without error, and outputs an ACK if the downlink shared channel signal has been received without an error or outputs a NACK if an error is detected, and, if a downlink shared channel signal is not detected, performs retransmission check with respect to each state of the DTX, and outputs a retransmission acknowledgement signal. When a plurality of CCs are allocated for communication with the base station, whether or not the downlink shared channel signal has been received without error is determined on a per CC basis. Also, the retransmission check section 1402 detects the above three states on a per codeword basis. Upon two-codeword transmission, the above three states are detected on a per codeword basis. The retransmission check section 1402 outputs the detection result to the transmitting section (here, the control information transmission channel selection section 1201).

The downlink control information demodulation section 1403 demodulates the downlink control information from the radio base station apparatus and detects the number of transport blocks and the rate matching method. When a plurality of CCs are allocated for communication with the base station, the number of blocks set for each CC is detected. The downlink control information demodulation section 1403 outputs the detection result of the number of transport blocks to the channel selection control section 1101, and outputs the rate matching method to the de-rate matching method determining section 1404. The de-rate matching method determining section 1404 determines the de-rate matching method corresponding to the rate matching method of the PDSCH detected from the PDCCH, as the PDSCH de-rate matching method.

The control information transmission channel selection section 1201 selects the channel to transmit the retransmission acknowledgement signal, which is feedback control information. To be more specific, whether the retransmission acknowledgement signal is included and transmitted in the uplink shared channel (PUSCH) or transmitted by the uplink control channel (PUCCH) is determined. For example, in a subframe upon transmission, when there is a PUSCH signal, the retransmission acknowledgement signal is output to the uplink shared channel processing section 100, mapped to the PUSCH and transmitted. On the other hand, when there is no PUSCH signal in the subframe, the retransmission acknowledgement signal is output to the uplink control channel (PUCCH) processing section 1100, and is transmitted using the radio resource of the PUCCH.

The uplink shared channel processing section 1000 has a control information bit determining section 1006, which determines the bits of the retransmission acknowledgement signal based on the detection result of the retransmission check section 1402, a channel coding section 1007, which performs error correction coding of the ACK/NACK bit sequence, a channel coding section 1001, which performs error correction coding of the data sequence to be transmitted, data modulation sections 1002 and 1008, which perform data modulation of the data signal after coding, a time multiplexing section 1003, which time-multiplexes the modulated data signal and the retransmission acknowledgement signal, a DFT section 1004, which performs a DFT (Discrete Fourier Transform) of the time-multiplexed signal, and a subcarrier mapping section 1005, which maps the signal after the DFT to subcarriers.

The uplink control channel (PUCCH) processing section 1100 has a channel selection control section 1101, which controls the radio resources of the PUCCH to use to transmit the retransmission acknowledgement signal, a PSK data modulation section 1102, which performs PSK data modulation, a cyclic shift section 1103, which applies a cyclic shift to the data modulated in the PSK data modulation section 1102, a block spreading section 1104, which performs block spreading of the signal after cyclic shifting, by a block spreading code, and a subcarrier mapping section 1105, which maps the signal after block spreading to subcarriers.

The channel selection control section 1101 determines the radio resource to use to transmit the retransmission acknowledgement signal from the radio resources of the uplink control channel of a PCC, with reference to a mapping table. The mapping table which the channel selection control section 1101 uses defines the combinations of retransmission acknowledgement signals in response to the downlink shared channel signals of the PCC and the SCC using a plurality of radio resources and bit information of phase modulation. The channel selection control section 1101 changes the content of the mapping table as appropriate according to the number of transport blocks reported, acquired by demodulating the downlink control information from the base station. To be more specific, it is possible to apply content selecting predetermined parts of the mapping table, depending on the number of transport blocks of the PCC and SCC. The selection information is reported to the PSK data modulation section 1102, the cyclic shift section 1103, the block spreading section 1104 and the subcarrier mapping section 1105.

The PSK data modulation section 1102 performs phase modulation (PSK data modulation) based on information reported from the channel selection control section 1101. For example, in the PSK data modulation section 1102, modulation into two bits of bit information by QPSK data modulation is performed.

The cyclic shift section 1103 performs orthogonal multiplexing using cyclic shifting of the CAZAC (Constant Amplitude Zero Auto Correlation) code sequence. To be more specific, a time domain signal is shifted through a predetermined amount of cyclic shift. Note that the amount of cyclic shift varies per user, and is associated with the cyclic shift indices. The cyclic shift section 1103 outputs the signal after the cyclic shift to the block spreading section 1104. The block spreading section (orthogonal code multiplication section) 1104 multiplies the reference signal after cyclic shifting by an orthogonal code (performs block spreading). Here, the OCC (block spreading code number) to use for the reference signal may be reported by RRC signaling and so on from an upper layer, or the OCC that is associated with the CS of data symbol in advance may be used. The block spreading section 1104 outputs the signal after the block spreading to the subcarrier mapping section 1105.

The subcarrier mapping section 1105 maps the signal after the block spreading to subcarriers, based on information that is reported from the channel selection control section 1101. Also, the subcarrier mapping section 1105 outputs the mapped signal to the channel multiplexing section 1202.

The SRS processing section 1300 has an SRS signal generating section 1301, which generates an SRS signal (Sounding RS), and a subcarrier mapping section 1302, which maps the SRS signal to subcarriers. The subcarrier mapping section 1302 outputs the mapped signal to the channel multiplexing section 1202.

The channel multiplexing section 1202 time-multiplexes the signal from the uplink shared channel processing section 1000 or the uplink control channel processing section, and the reference signal from the SRS signal processing section 1300, and generates a transmission signal including an uplink control channel signal.

The IFFT section 1203 performs an IFFT of the channel-multiplexed signal and converts it into a time domain signal. The IFFT section 1203 outputs the signal after the IFFT to the CP attaching section 1204. The CP attaching section 1204 attaches CPs to the signal after the orthogonal code multiplication. Then, an uplink transmission signal is transmitted to the radio communication apparatus using the uplink channel of the PCC.

Next, interference coordination according to the present embodiment configured as described above will be described in detail.

The operations related to interference coordination, shown in FIG. 3 will be described. The macro base station B1 applies an ABS/MBSFN frame in a specific subframe (for example, the second macro cell-subframe shown in FIG. 3), arranges CRSs and PHICH only in the first OFDM symbol of the macro cell subframe, and transmits a downlink channel signal to a macro UE. In the macro base station section 20, in the specific subframe, the reference signal generating section 311 generates only the CRSs to multiplex on the top OFDM symbol, and the PHICH generating section 313 generates an ACK/NACK signal related to the UL grant eight subframes earlier. Then, in the specific subframe, the PDCCH generating section 312 and the PDSCH generating section 314 do not generate channel signals, thus creating a non-transmission period.

The micro base station B2 is reported information related to the specific subframe from the macro base station B1. The information about the specific subframe may be reported from the macro base station B1 to the micro base station B2 by cooperation between the scheduler 205 and the scheduler 34, or may be determined in advance on a fixed basis.

The micro base station B2 transmits the PDCCH and the PDSCH in a specific subframe that is reported. At this time, transmission symbols are controlled such that the PDCCH starting position is arranged shifted by one OFDM symbol, not to send the PDCCH in the top one OFDM symbol of the micro cell subframe. The starting position of the PDCCH is controlled in the PDCCH generating section 312 (B2) having received a command from the scheduler 205.

The micro base station B2 reports information related to the specific subframe, where the PDCCH starting position is shifted, in advance, so that the micro UE is able to demodulate the PDCCH correctly. The information related to the specific subframe is reported may be reported to the micro UE by higher layer signaling.

When the user terminal 30, which serves as the micro UE, receives the information related to the specific subframe by higher layer signaling, the user terminal 30 saves the information of the specific subframe. In the user terminal 30, the channel demultiplexing section 1400 demultiplexes the downlink received signal into downlink control information and data signal. The downlink control information demodulation section 1403 normally starts receiving the downlink control information from the top OFDM symbol of a subframe and demodulates the PDCCH. Then, when receiving the specific subframe reported in advance, the downlink control information demodulation section 1403 starts receiving the PDCCH from the second OFDM symbol of a subframe. The starting position of the PDCCH in the specific subframe is by no means limited to the second OFDM symbol, and, from the perspective of reducing overhead, the specific subframe and the PDCCH starting position are preferably linked.

By this means, even when the micro base station B2 shifts the starting position of the PDCCH by one symbol and transmits the PDCCH, the user terminal 30 is still able to recognize the starting position of the PDCCH in the specific subframe and therefore demodulate the PDCCH accurately. Consequently, even when the macro base station B1 transmits CRSs and PHICH in the first OFDM symbol, it is possible to demodulate the PDCCH accurately in the micro cell.

Next, operations related to the interference coordination shown in FIGS. 4A and 4B will be described. The macro base station B1 applies an ABS/MBSFN frame in a specific subframe (the second macro cell subframe shown in FIGS. 4A and 4B), arranges CRSs only in the first OFDM symbol of the macro cell subframe, and transmits the downlink signal to the macro UE. In the macro base station section 20, in the specific subframe, the PDCCH generating section 312 and the PDSCH generating section 314 do not generate channel signals, thus providing a non-transmission period.

The micro base station B2 is reported information related to the specific subframe from the macro base station B1. The information about the specific subframe may be reported from the macro base station B1 to the micro base station B2 (reporting by the interference coordination method shown in FIG. 4A) by cooperation between the scheduler 205 and the scheduler 34, or may be determined in advance on a fixed basis.

The micro base station B2 transmits the X-PDCCH and the PDSCH in the specific subframe reported, and transmits the DM-RS over the entire system band. In the specific subframe, the X-PDCCH is defined in the data field. Assuming that the top several OFDM symbols (maximum three OFDM symbol) of the specific subframe are the control field and the rest of the symbol field is the data field, the X-PDCCH is transmitted by specific subcarriers in the data field. The time-multiplexing and subcarrier mapping of the X-PDCCH in the data field are performed in the OFDM modulation section 302. The macro cell transmits the CRSs, PHICH and PCFICH only in the control field, so that, in the micro cell, interference against the X-PDCCH transmitted in the data field of the specific subframe is prevented.

The micro base station B2 expands the channel signal (user data) generated in the PDSCH generating section 314 (B2) to the control field of the specific subframe. Micro cell CRSs are arranged in the top OFDM symbol of the specific subframe, so that the PDSCH is arranged in resources which do not overlap the micro cell CRSs in the control field. However, when a cell ID that is different from the macro cell is applied to the micro cell, there is interference from the CRSs of the macro cell, and, as shown in FIG. 4A, in the micro cell, the resource elements corresponding to the macro cell CRSs are muted. In the micro cell subframe, resource elements that are muted in the control field are subject to rate matching (the first rate matching method). The PDCCH generating section 312 (B2) generates downlink control information (DCI), to which the first rate matching method is added.

Also, when the interference coordination shown in FIG. 4B is selected, there is a possibility that the PHICH is transmitted in a specific subframe of the macro cell. The PHICH is multiplexed on resource elements that do not overlap the CRSs in the top OFDM. Consequently, in the specific subframe of the micro cell, even in resource elements that collide with the PHICH, the PDSCH suffers interference. So, in the top OFDM symbol where the PHICH and CRSs are arranged, starting transmitting the PDSCH from the second OFDM symbol of the specific subframe, without arranging the PDSCH of the micro cell, makes simpler design possible. In this case, in the micro cell subframe, the first OFDM symbol of the control field is entirely subject to rate matching (the second rate matching method). The PDCCH generating section 312 (B2) generates downlink control information (DCI), to which the second rate matching method is added.

The scheduler 205 of the macro base station section 20 selects the interference coordination method depending on whether or not the PHICH is transmitted in the specific subframe and designates the selected interference coordination method (which is linked to the rate matching method) to the scheduler 34 of the micro base station B2, and the scheduler 34 switches the rate matching method. The rate matching section 104 (B2) of the OFDM modulation section 302 (B2) adopts the designated rate matching method. Also, the scheduler 205 of the macro base station section 20 may select the interference coordination method based on other elements than whether or not the PHICH is transmitted in the specific subframe.

The micro base station B2 reports information related to the specific subframe where the X-PDCCH is applied, to the micro UE, in advance, so that the micro UE is able to demodulate the PDCCH correctly. The information related to the specific subframe may be reported to the micro UE by higher layer signaling.

When the user terminal 30, which serves as the micro UE, receives the information related to the specific subframe by higher layer signaling, the user terminal 30 saves the information of the specific subframe. In the user terminal 30, the channel demultiplexing section 1400 demultiplexes the downlink received signal into downlink control information and data signal. The downlink control information demodulation section 1403 normally starts receiving the downlink control information from the top OFDM symbol of a subframe and demodulates the PDCCH. Then, when receiving the specific subframe reported in advance, the downlink control information demodulation section 1403 starts receiving the X-PDCCH from the data field of a subframe. The rate matching method added to the demodulated X-PDCCH is passed on to the rate matching method determining section 1404. The de-rate matching method determining section 1404 identifies the rate matching method of the PDSCH transmitted in the specific subframe, and reports the de-rate matching method of the PDSCH to the data information demodulation section 1401. The data information demodulation section 1401 demodulates the PDSCH based on the de-rate matching method reported. Consequently, even if the PDSCH rate matching method is switched adaptively in the micro base station B2, it is still possible to perform de-rate matching of the PDSCH adequately and demodulate the PDSCH correctly.

Next, operations related to the interference coordination shown in FIGS. 5A and 5B will be described. Although the macro cell and the micro cell have the same cell ID, the same CRSs are allocated to the same resource elements between the macro cell and the micro cell. Although an ABS/MBSFN frame is adopted in a specific subframe (the second macro cell subframe shown in FIGS. 5A and 5B), in FIG. 5B, the PDCCH is allocated to the control field of the macro cell subframe. In other words, a protected subframe is also designed such that the PDCCH can be transmitted in the macro cell.

When the micro base station B2 selects the interference coordination of FIG. 5A, the selection of the interference coordination of FIG. 5A is commanded from the scheduler 205 of the macro base station section 20. In the micro base station B2, in the specific subframe where the interference coordination of FIG. 5A is selected, the X-PDCCH and the PDSCH are transmitted, and the DM-RS is transmitted over the entire system band. Micro cell CRSs are arranged in the top OFDM symbol of a specific subframe, so that the PDSCH is arranged in resources that do not overlap the micro cell CRS in the control field. The PDSCH can be arranged in resource elements other than CRSs, so that rate matching is not necessary (the case where rate matching is not necessary is referred to as "the third rate matching method"). The PDCCH generating section 312 (B2) generates downlink control information (DCI) to which the third rate matching method is added.

When the interference coordination of FIG. 5B is selected, the selection of the interference coordination of FIG. 5B is commanded from the scheduler 205 of the macro base station section 20 to the micro base station B2. The micro base station B2 transmits the X-PDCCH and the PDSCH in the specific subframe where the interference coordination of FIG. 5B is selected, and transmits the DM-RS over the entire system band. Since the CRSs and PDCCH of the micro cell are arranged in the top OFDM symbol of the specific subframe, the PDSCH is arranged in the top resource of the data field, without arranging the PDSCH in the control field. Consequently, the rate matching section 104 (B2) performs rate matching with respect to the entire control field, in accordance with the command from the scheduler 34 (the fourth rate matching method). The PDCCH generating section 312 (B2) generates downlink control information (DCI), to which the fourth rate matching method.

The scheduler 205 of the macro base station section 20 determines the rate matching method depending on whether or not the PDCCH is transmitted in a protected subframe, and designates the determined rate matching method to the scheduler 34 of the micro base station B2, and the scheduler 34 switches the rate matching method on a dynamic basis. The operations in the user terminal 30, which serves as the micro UE, are the same as described above.

Figure 12:
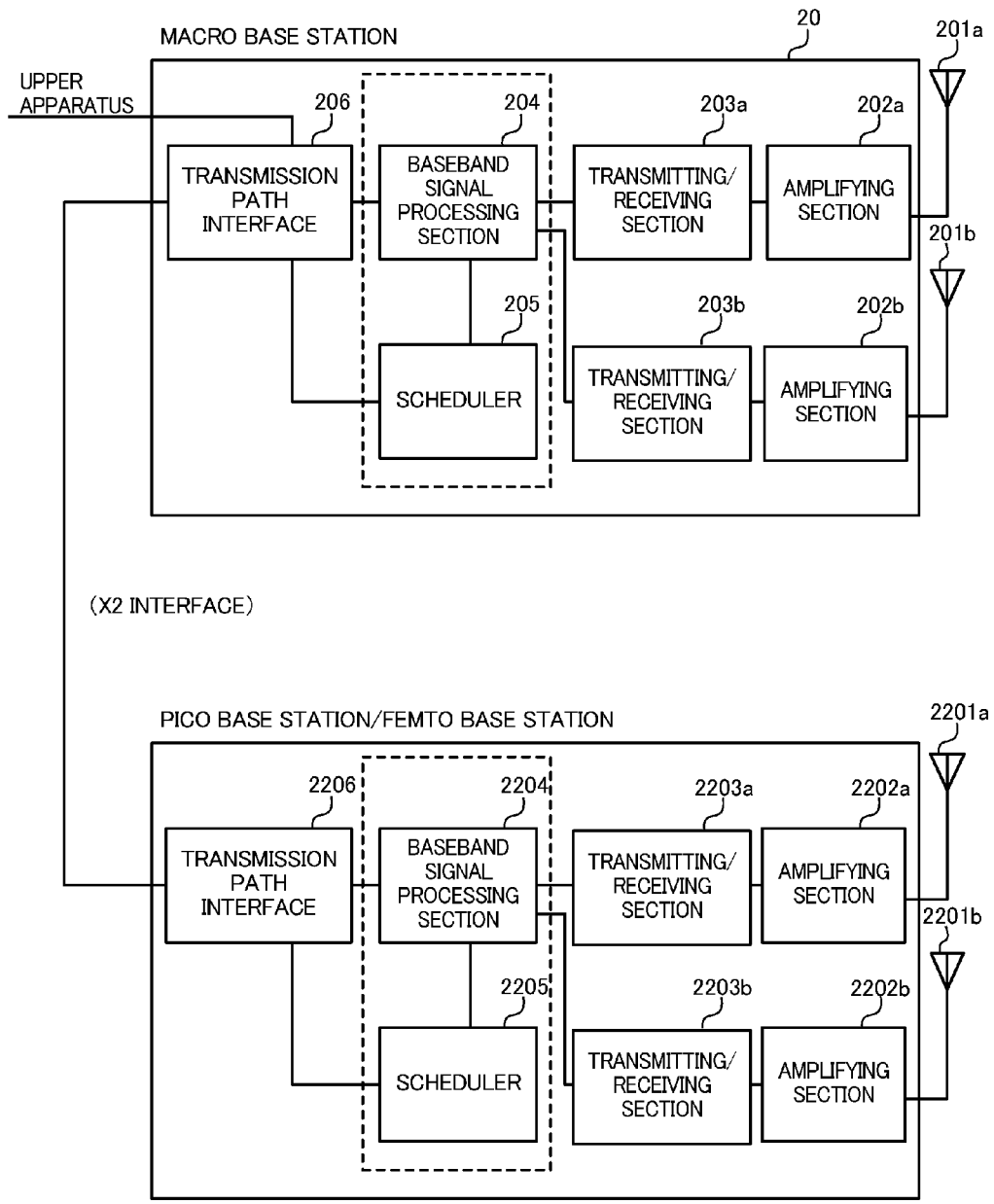
FIG. 12 is a functional block diagram of a macro base station and a pico base station.

Although, in the above description, the RRH 30 has been described as an example of a small transmission power node, a pico base station, a femto base station and so on are equally applicable. FIG. 12 shows a system configuration diagram in which a pico base station (or a femto base station), instead of an RRH, cooperates with the macro base station B1. As shown in this drawing, the macro base station B1 and the pico base station (or the femto base station) are formed basically with the same function blocks. That is to say, the pico base station (the femto base station) has transmitting/receiving antennas 2201a and 2201b, amplifying sections 2202a and 2202b, transmitting/receiving sections 2203a and 2203b, a baseband signal processing section 2204, a scheduler 2205, and a transmission path interface 2206. The macro base station B1 and the pico base station are connected so as to be able to communicate with each other, via, for example, an X2 interface.

Also, although, in the above description, a non-transmission period, in which the macro base station stops transmitting signals while leaving minimal quality measurement signals, has been described as an example of a specific subframe, subframes outside a non-transmission period are equally applicable.

Now, although the present invention has been described in detail with reference to the above embodiments, it should be obvious to a person skilled in the art that the present invention is by no means limited to the embodiments described in this specification. For example, the number of users and the number of processing sections in the devices in the above embodiment are by no means limiting, and it is equally possible to change these as appropriate depending on devices. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

The disclosure of Japanese Patent Application No. 2011-029081, filed on Feb. 14, 2011, including the specification, drawings and abstract, is incorporated herein by reference in its entirety.

The invention claimed is:

1. A radio communication control method in a user terminal, the radio communication control method comprising the steps of:
receiving, in a specific subframe, a downlink signal having a physical downlink data channel (PDSCH) and a physical downlink control channel (X-PDCCH) that are frequency-division-multiplexed and allocated to a first radio resource, from a first symbol in the first radio resource, the first radio resource being a data region corresponding to symbols following a first predetermined number of symbols in the specific subframe, and receiving, in another specific subframe, a downlink signal having a physical downlink data channel (PDSCH) and a physical downlink control channel (X-PDCCH) that are frequency-division-multiplexed and allocated to a second radio resource, the second radio resource being an enhanced data region corresponding to first to last symbols in the other specific subframe in which allocation of the physical downlink data channel (PDSCH) starts with any symbol among a first predetermined number of symbols in the second radio resource, and allocation of the physical downlink control channel (X-PDCCH) starts with a symbol following the first predetermined number of symbols in the second radio resource; and
specifying the physical downlink control channel (X-PDCCH) from the received downlink signal based on information about a physical downlink control channel (X-PDCCH) configuration given from a radio base station by higher layer signaling,
wherein the user terminal is switchable between a configuration where allocation of the PDSCH starts with a same symbol as allocation of the X-PDCCH in the specific subframe and a configuration where allocation of the PDSCH starts with an earlier symbol than allocation of the X-PDCCH in the other specific subframe.

2. A user terminal comprising:
a receiving section that receives, in a specific subframe, a downlink signal having a physical downlink data channel (PDSCH) and a physical downlink control channel (X-PDCCH) that are frequency-division-multiplexed and allocated to a first radio resource, from a first symbol in the first radio resource, the first radio resource being a data region corresponding to symbols following a first predetermined number of symbols in the specific subframe, and receives, in another specific subframe, a downlink signal having a physical downlink data channel (PDSCH) and a physical downlink control channel (X-PDCCH) that are frequency-division-multiplexed and allocated to a second radio resource, the second radio resource being an enhanced data region corresponding to first to last symbols in the other specific subframe in which allocation of the physical downlink data channel (PDSCH) starts with any symbol among a first predetermined number of symbols in the second radio resource, and allocation of the physical downlink control channel (X-PDCCH) starts with a symbol following the first predetermined number of symbols in the second radio resource; and
a processing section that specifies the physical downlink control channel (X-PDCCH) from the received downlink signal based on information about a physical downlink control channel (X-PDCCH) configuration given from a radio base station by higher layer signaling,
wherein the user terminal is switchable between a configuration where allocation of the PDSCH starts with a same symbol as allocation of the X-PDCCH in the specific subframe and a configuration where allocation of the PDSCH starts with an earlier symbol than allocation of the X-PDCCH in the other specific subframe.

* * * * *